(12) United States Patent
Raymond et al.

(10) Patent No.: US 6,837,413 B1
(45) Date of Patent: Jan. 4, 2005

(54) PLASTIC FASTENER, FASTENER CLIP, FASTENER DISPENSING TOOL AND METHOD OF FASTENING OBJECTS

(75) Inventors: Jeffrey A. Raymond, Leominster, MA (US); Paul A. Davignon, Uxbridge, MA (US); Charles L. Deschenes, North Attleboro, MA (US); William J. Cooper, Woonsocket, RI (US); Clark L. Grendol, Sturbridge, MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/914,757
(22) PCT Filed: Mar. 2, 2000
(86) PCT No.: PCT/US00/05649
§ 371 (c)(1), (2), (4) Date: Aug. 26, 2002
(87) PCT Pub. No.: WO00/51792
PCT Pub. Date: Sep. 8, 2000

Related U.S. Application Data

(63) Continuation-in-part of application No. 09/483,180, filed on Jan. 13, 2000, now Pat. No. 6,267,285, and a continuation-in-part of application No. 09/483,181, filed on Jan. 13, 2000, now Pat. No. 6,418,597.
(60) Provisional application No. 60/122,557, filed on Mar. 2, 1999.

(51) Int. Cl.[7] .............................. A41H 37/10; B65C 7/00
(52) U.S. Cl. ............................................ 227/67; 29/428
(58) Field of Search .............................. 227/61, 71, 19, 227/67; 29/428; 206/346

(56) References Cited

U.S. PATENT DOCUMENTS

| | | | |
|---|---|---|---|
| 2,054,994 A | 9/1936 | Stainbrook | |
| 2,729,177 A | 1/1956 | Flood | |
| 3,103,666 A | 9/1963 | Bone | |
| 3,325,853 A | 6/1967 | Stroweis | |
| 3,494,004 A | 2/1970 | Bone | |
| 3,733,657 A | 5/1973 | Lankton | |
| 3,734,375 A | 5/1973 | Bone et al. | |
| 3,735,908 A | 5/1973 | Kinney et al. | |
| 3,850,297 A | 11/1974 | Merser | |
| 3,880,339 A | 4/1975 | Bone | |
| 3,902,649 A | 9/1975 | Kato | |
| 3,948,295 A | 4/1976 | Lemont et al. | |
| 3,985,067 A | 10/1976 | Livio et al. | |

(List continued on next page.)

FOREIGN PATENT DOCUMENTS

AU 243745 3/1963

OTHER PUBLICATIONS

Copy of Avery Dennison Corp., Fastener Division (Framingham, MA) sales literature for Dennison® SWIFTACH® systems, published before filing of the present application.

*Primary Examiner*—Scott A. Smith
(74) *Attorney, Agent, or Firm*—Kriegsman & Kriegsman

(57) ABSTRACT

According to one embodiment, the plastic fastener comprises a flexible filament having a length of about 4.3 mm and a tensile strength of about 2 pounds, a first transverse bar located at one end of the flexible filament, and a second transverse bar located at the opposite end of the flexible filament. The fastener clip, which preferably does not contain a runner bar, comprises a plurality of identical fasteners of the aforementioned type, each of the fasteners being arranged in a parallel, side-by-side, spaced relationship. A connector post connects the first transverse bars of adjacent fasteners, and a connector post connects the second transverse bars of adjacent fasteners. An extra transverse bar is connected by a connector post to the first transverse bar of the last fastener, and another extra transverse bar is connected by a connector post to the second transverse bar of the last fastener, the extra transverse bars not being interconnected by a flexible filament.

28 Claims, 16 Drawing Sheets

U.S. PATENT DOCUMENTS

| | | | |
|---|---|---|---|
| 4,039,078 A | 8/1977 | Bone | |
| 4,111,347 A | 9/1978 | Bone | |
| 4,121,487 A | 10/1978 | Bone | |
| 4,240,183 A | 12/1980 | Sumimoto et al. | |
| 4,315,587 A | 2/1982 | Ritter et al. | |
| 4,323,183 A | 4/1982 | Duchin | |
| 4,333,566 A | 6/1982 | Holmes | |
| 4,417,656 A | 11/1983 | Kato | |
| 4,456,123 A | 6/1984 | Russell | |
| 4,456,161 A | 6/1984 | Russell | |
| 4,499,928 A | 2/1985 | Furutsu | |
| 4,533,076 A | 8/1985 | Bourque | |
| 4,534,464 A | 8/1985 | Lankton | |
| 4,582,236 A | 4/1986 | Hirose | |
| 4,586,609 A | 5/1986 | Won | |
| 4,610,384 A | 9/1986 | Duchin | |
| 4,610,385 A | 9/1986 | Duchin | |
| RE32,332 E | 1/1987 | Kato | |
| 4,634,036 A | 1/1987 | Duchin | |
| 4,654,935 A | 4/1987 | Bone | |
| 4,660,718 A | 4/1987 | Kato et al. | |
| 4,681,248 A | 7/1987 | Duchin | |
| 4,682,721 A | 7/1987 | Duchin | |
| 4,683,635 A | 8/1987 | Duchin | |
| 4,690,317 A | 9/1987 | Hamisch, Jr. et al. | |
| 4,712,677 A | 12/1987 | Russell | |
| 4,718,158 A | 1/1988 | Block | |
| 4,789,091 A | 12/1988 | Randolph | |
| 4,901,854 A | 2/1990 | Bone et al. | |
| 4,943,294 A | 7/1990 | Knapp | |
| 5,024,365 A | 6/1991 | Bourque | |
| 5,033,664 A | 7/1991 | Bone et al. | |
| 5,205,458 A | 4/1993 | Kunreuther | |
| 5,320,269 A | 6/1994 | Deschenes et al. | |
| 5,321,872 A | 6/1994 | Merser | |
| 5,339,954 A * | 8/1994 | Kunreuther | 206/346 |
| RE34,891 E | 4/1995 | Kunreuther | |
| 5,405,070 A | 4/1995 | Kunreuther | |
| 5,463,799 A | 11/1995 | Graham | |
| D365,003 S | 12/1995 | Davignon et al. | |
| 5,471,727 A | 12/1995 | Kubota | |
| 5,472,130 A | 12/1995 | Beringhause et al. | |
| 5,482,196 A * | 1/1996 | Doyel | 227/67 |
| 5,495,974 A | 3/1996 | Deschenes et al. | |
| 5,501,002 A | 3/1996 | Fukami | |
| 5,518,162 A | 5/1996 | Deschenes et al. | |
| 5,529,233 A | 6/1996 | Davignon et al. | |
| 5,593,033 A | 1/1997 | Kunreuther | |
| 5,598,948 A | 2/1997 | Rizer | |
| 5,622,257 A | 4/1997 | Deschenes et al. | |
| 5,683,025 A | 11/1997 | Grendol | |
| 5,723,320 A | 3/1998 | Dehlinger | |
| 5,738,265 A | 4/1998 | Hirai et al. | |
| 5,772,073 A | 6/1998 | Deschenes | |
| 5,788,138 A | 8/1998 | Deschenes et al. | |
| 5,799,375 A | 9/1998 | Fukami | |
| 5,810,238 A | 9/1998 | Kunreuther | |
| 5,816,775 A * | 10/1998 | Imai et al. | 415/143 |
| 5,950,901 A | 9/1999 | Kubota | |
| 6,026,544 A | 2/2000 | Deschenes et al. | |
| 6,047,823 A | 4/2000 | Deschenes et al. | |
| 6,129,206 A | 10/2000 | Cooper | |
| 6,267,285 B1 * | 7/2001 | Raymond et al. | 227/67 |
| 6,267,286 B1 * | 7/2001 | Deschenes et al. | 227/71 |

* cited by examiner

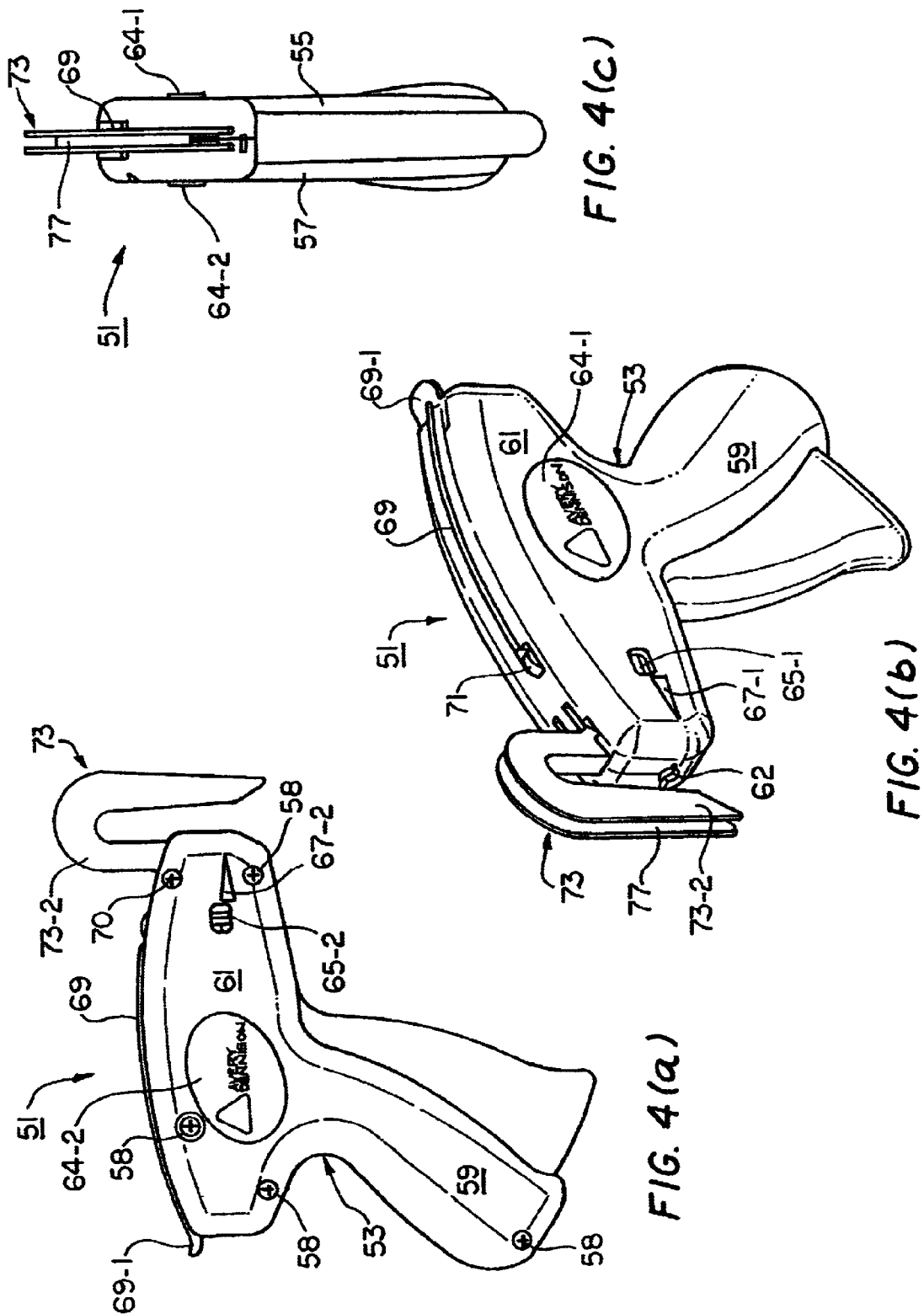

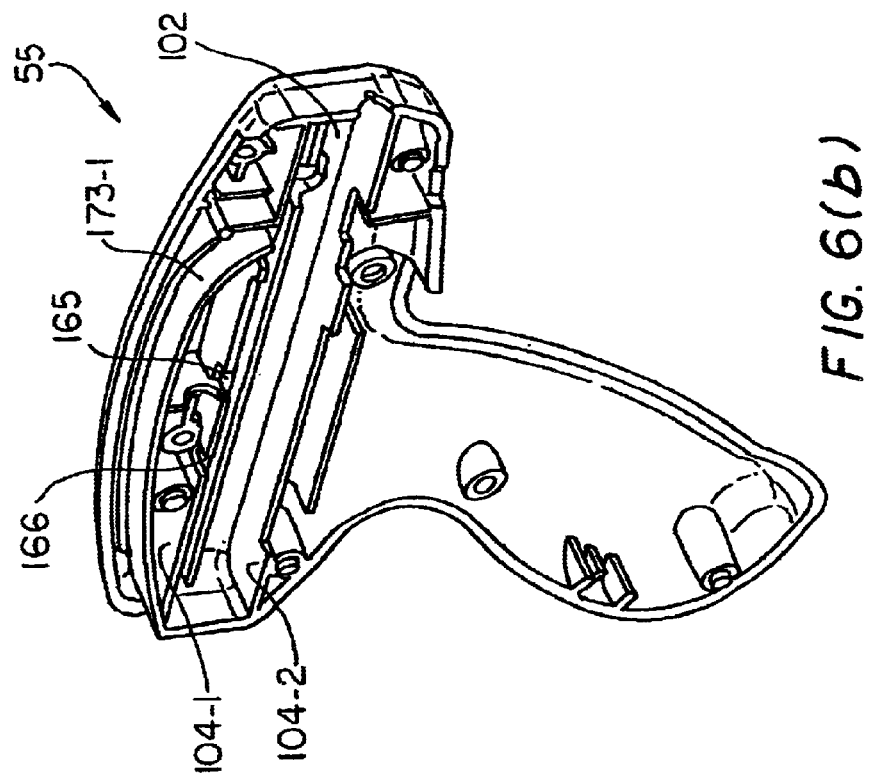
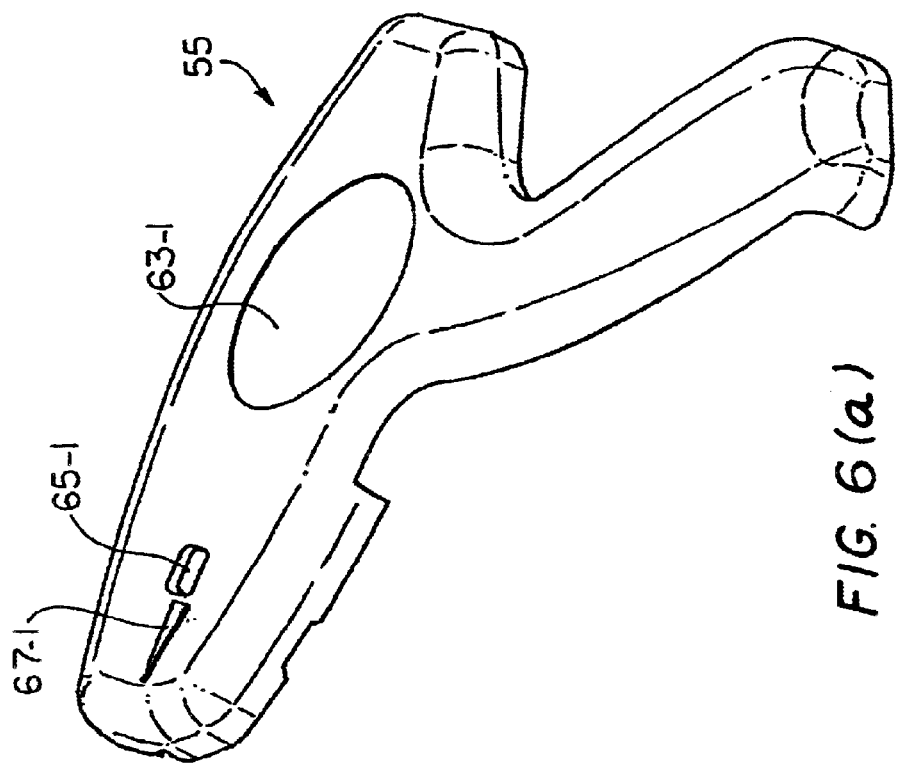
FIG. 6(b)
FIG. 6(a)

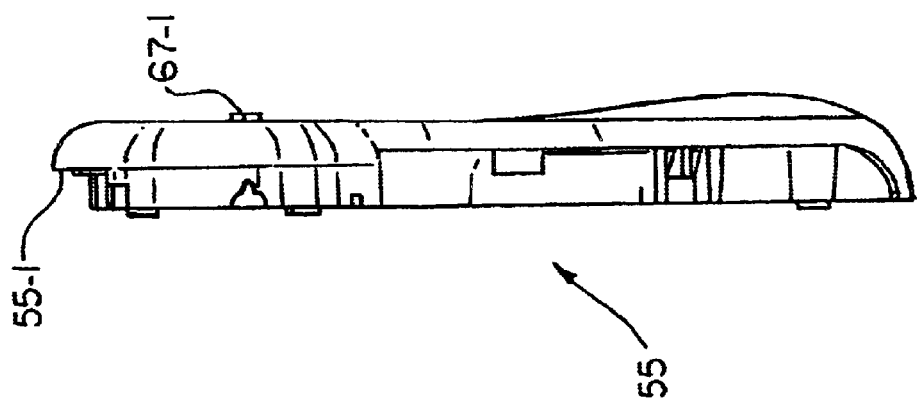
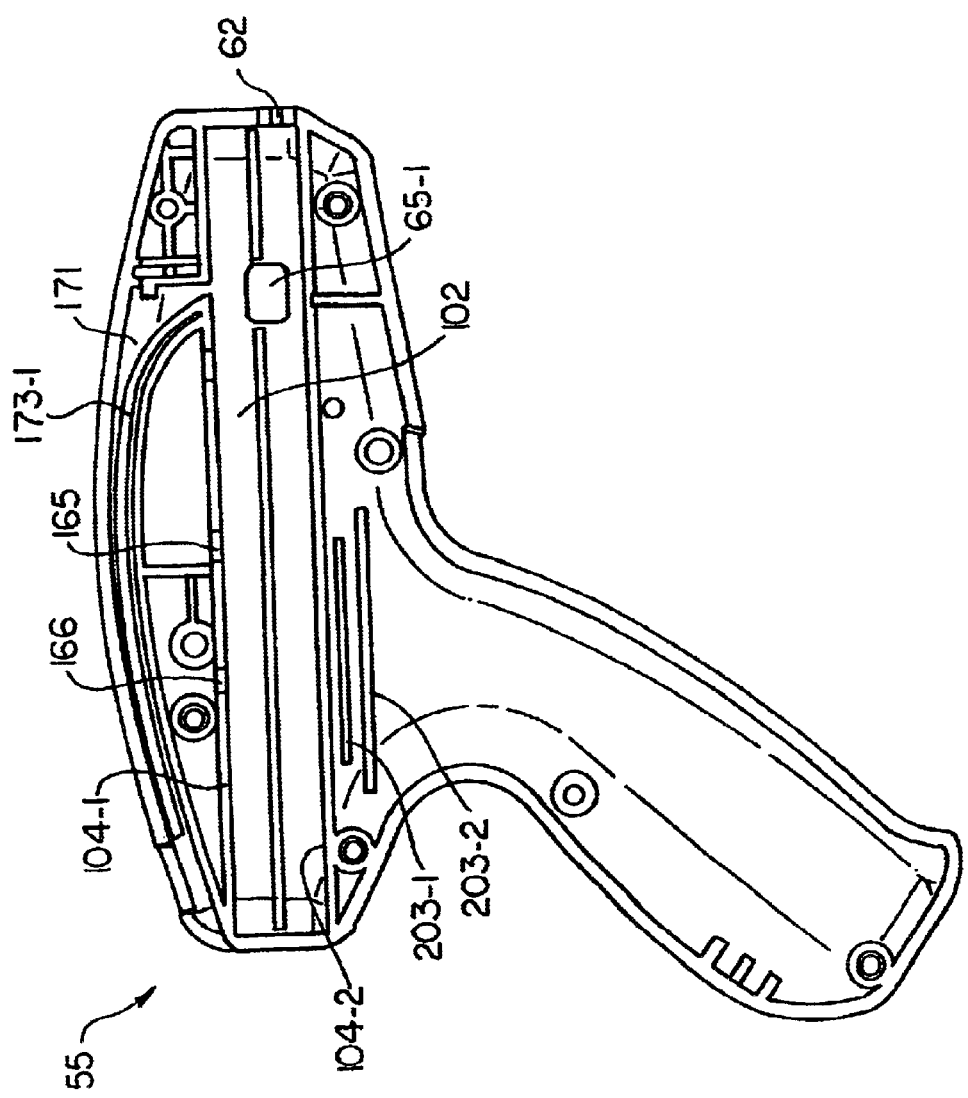

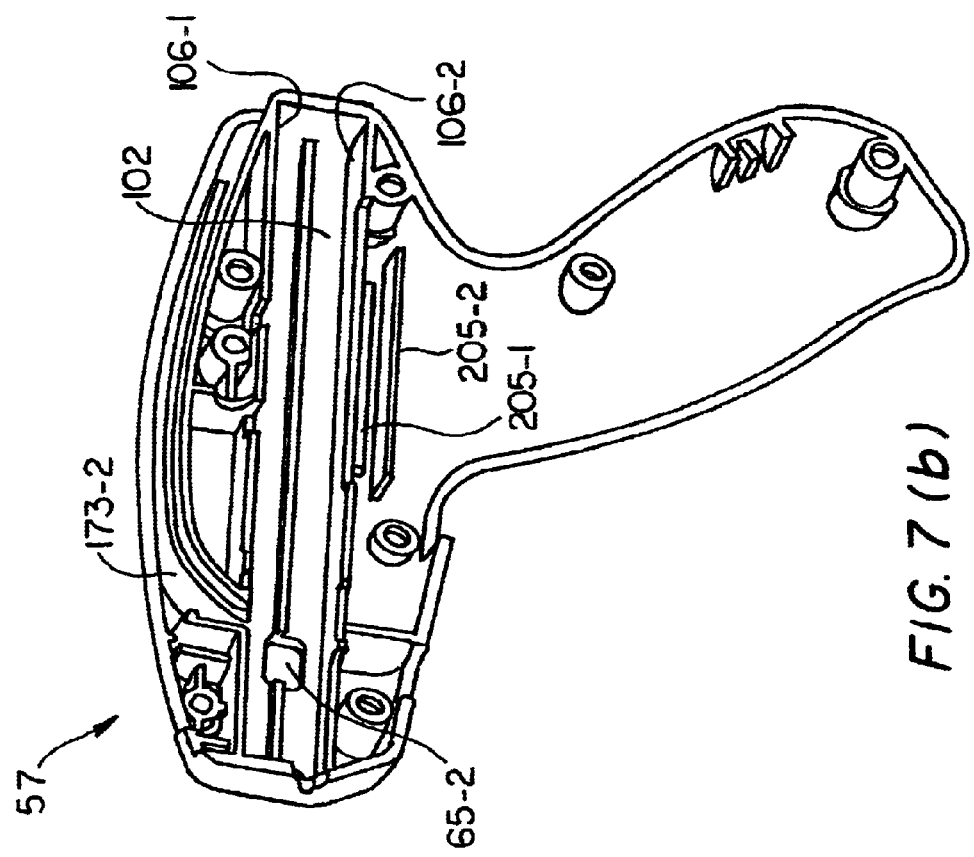
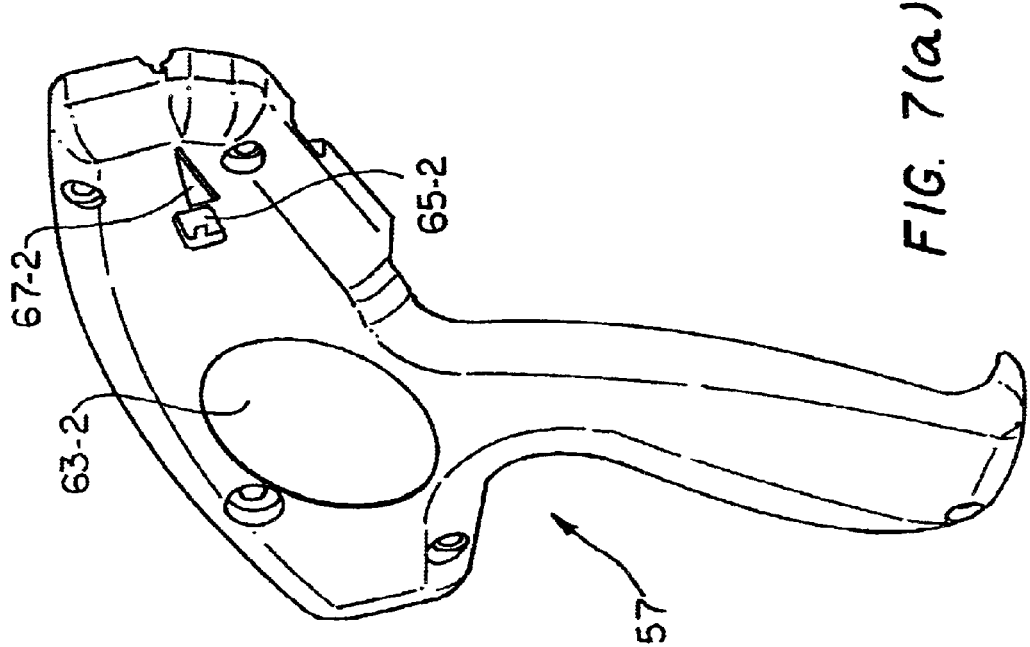

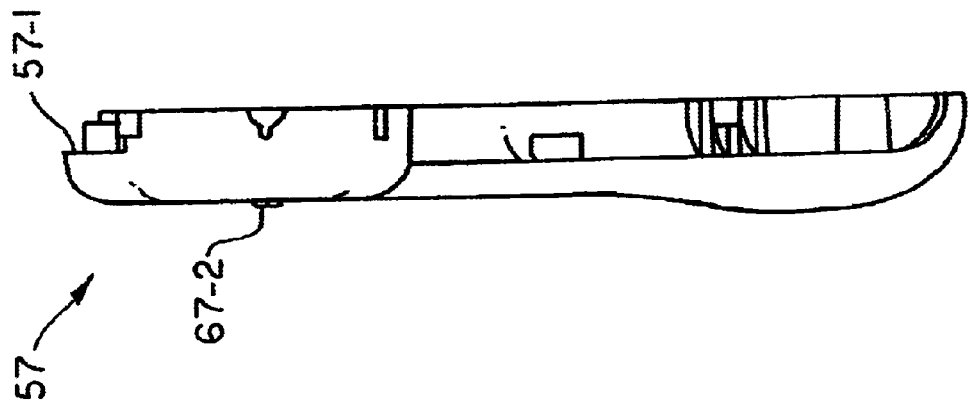
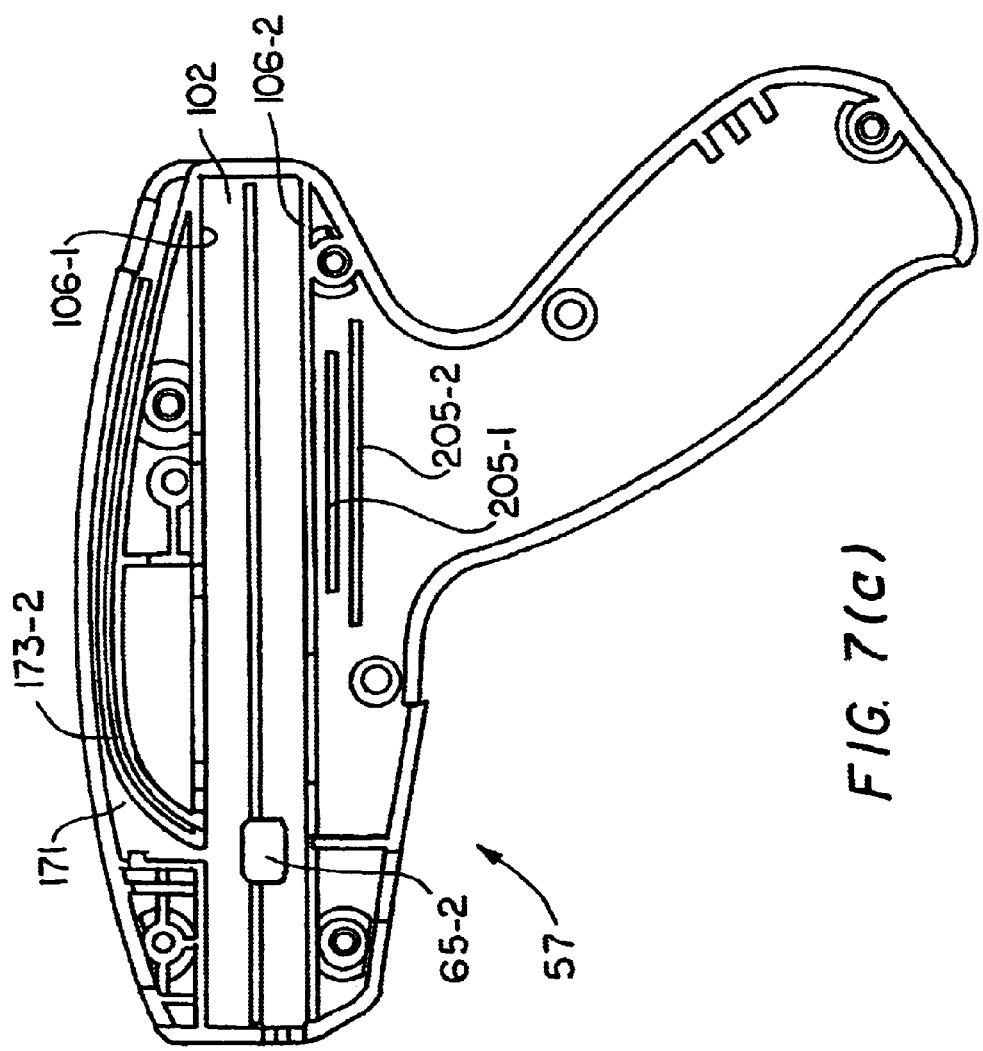

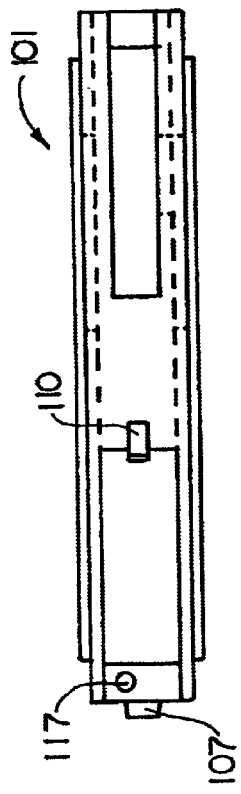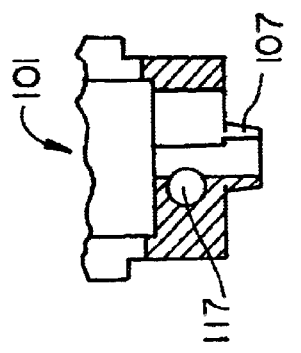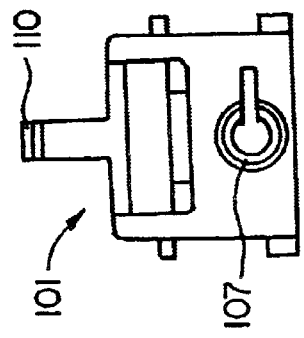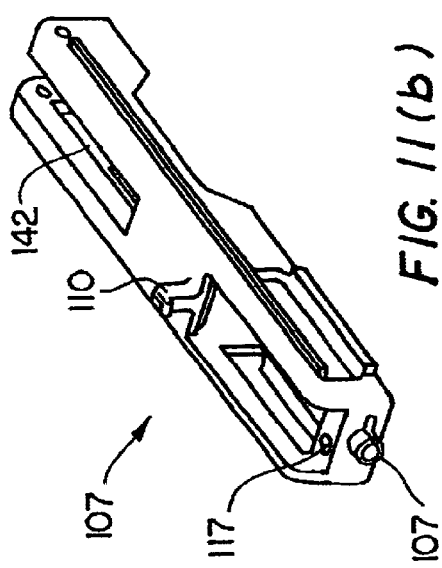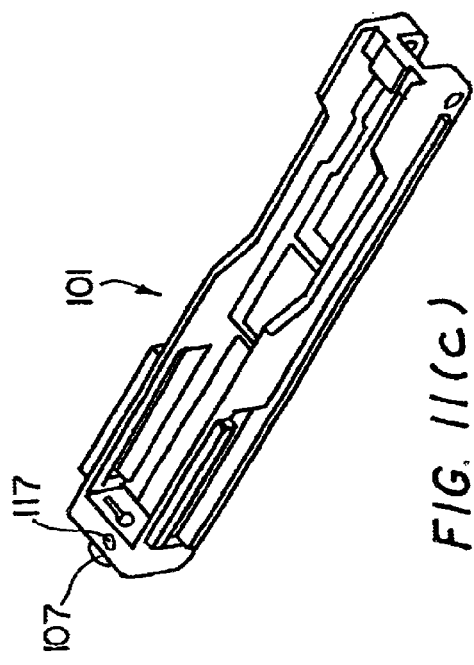
FIG. 11(d)
FIG. 11(F)
FIG. 11(e)
FIG. 11(b)
FIG. 11(c)

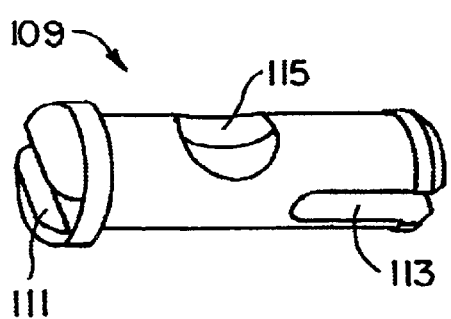
FIG. 12
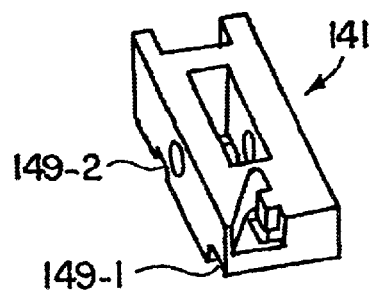
FIG. 14(a)
FIG. 14(b)
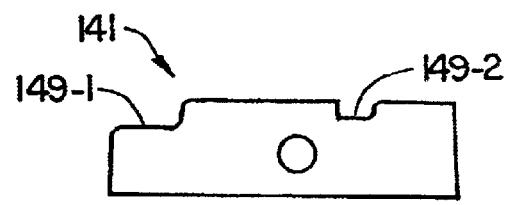
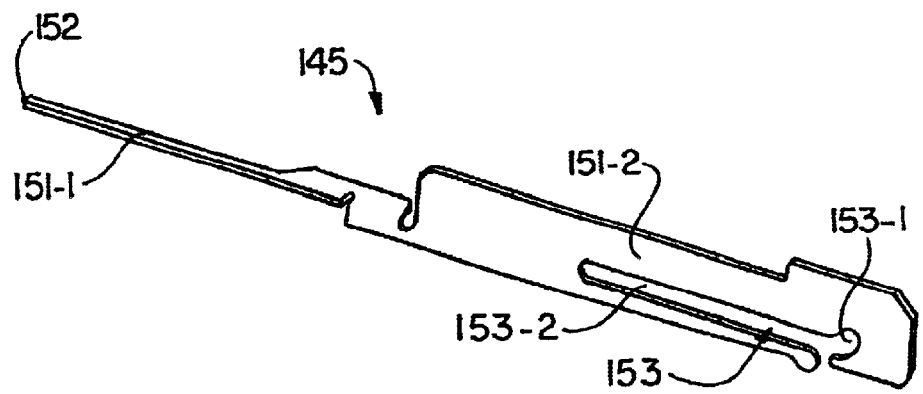
FIG. 15
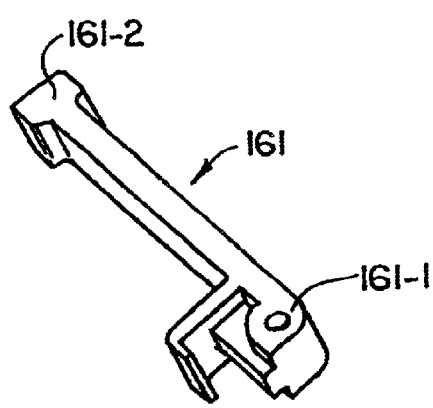
FIG. 16

PLASTIC FASTENER, FASTENER CLIP, FASTENER DISPENSING TOOL AND METHOD OF FASTENING OBJECTS

CROSS-REFERENCE TO RELATED APPLICATIONS

The present application is a continuation-in-part of U.S. patent application Ser. No. 09/483,180, filed Jan. 13, 2000, now U.S. Pat. No. 6,267,285, and a continuation-in-part of U.S. patent application Ser. No. 09/483,181, filed Jan. 13, 2000 now U.S. Pat. No. 6,418,597, and also claims the benefit under 35 U.S.C. 119(e) of U.S. Provisional Patent Application Ser. No. 60/122,557, filed Mar. 2, 1999, the disclosures of all the foregoing applications being incorporated herein by reference.

BACKGROUND OF THE INVENTION

The present invention relates generally to the fastening of objects using plastic fasteners and relates more particularly to a novel plastic fastener, a novel fastener clip, a novel fastener dispensing tool and a novel method of fastening objects.

Certain articles of clothing, most notably men's dress shirts, are often packaged and sold in a folded condition so as to minimize any wrinkling of the article and so as to present the article in an otherwise flattering manner. Typically, the article is maintained in a folded condition by means of one or more straight metal pins, each of said straight metal pins typically comprising an elongated shaft terminating at one end in a sharp tip designed to penetrate the article and at the other end in a rounded head designed not to penetrate the article. Typically in use, the article is folded, and a plurality of said pins are used to maintain the article in its folded condition by securing the article to itself at a plurality of different locations. Often, in the case of men's dress shirts, one or more of said pins are additionally used to secure the shirt to a piece of cardboard or to a similar backing material. The act of using straight metal pins to maintain an article of clothing in a folded condition is typically referred to in the art as "shirt-pinning."

Although straight metal pins have achieved widespread use in maintaining articles of clothing in a folded condition, certain shortcomings are associated therewith. One such shortcoming is that no suitable tool exists for dispensing such pins into an article of clothing; consequently, the pins must be inserted manually. As can readily be appreciated, the repeated insertion of such pins into articles of clothing, over time, can become both physically and mentally taxing. Another shortcoming associated with the use of straight metal pins is that the pins, as noted above, have sharp ends, which can cause injury both to the person who must insert the pin into the article and to the person (i.e., consumer) who must remove the pin from the article. Moreover, once the pins are removed from the article, they must be disposed of properly to avoid injury to others. Still another shortcoming associated with the use of straight metal pins is that such pins, when inserted, may cause damage to the article, either by snagging and tearing the article or by creating a conspicuous insertion hole in the article. Still yet another shortcoming associated with the use of straight metal pins is that such pins, once inserted into an article of clothing, can be difficult to access and manipulate in such a way as to enable their removal.

Plastic fasteners of the type comprising an elongated flexible filament having a first enlargement at one end thereof and a second enlargement at the opposite end thereof are well-known and have been widely used in the attachment of merchandise tags to articles of commerce, in the coupling or re-coupling of buttons to garments, in the binding of a shoe upper during the process of shoe-lasting, and in various packaging applications. In one common type of plastic fastener (see, for example, FIG. 1 of U.S. Pat. No. 5,321,872, which patent is incorporated herein by reference), the first enlargement has the shape of a first transverse bar and the second enlargement has the shape of a paddle or the shape of a second transverse bar, the first transverse bar and the paddle (or second transverse bar) extending in planes parallel to one another. In another common type of plastic fastener (see, for example, U.S. Pat. No. 3,494,004, which patent is incorporated by reference), the first enlargement has the shape of a transverse bar and the second enlargement has the shape of a knob or pin head. In still another common type of plastic fastener (see, for example, U.S. Pat. No. 4,240,183, which patent is incorporated herein by reference), the first enlargement has the shape of a transverse bar or the shape of a plug and the second enlargement has the shape of a socket, said socket being adapted to receive said transverse bar or said plug.

Plastic fasteners of the various types described above are typically molded as parts of a unitary fastener clip. An example of such a fastener clip is disclosed in U.S. Pat. No. 3,733,657, which patent is incorporated herein by reference. The clip of the aforementioned '657 patent includes a plurality of fasteners, each of said fasteners comprising a flexible filament having a first transverse bar (or "cross-bar") at one end thereof and a paddle or a second transverse bar (or "cross-bar") at the opposite end thereof, the transverse bar and the paddle (or second transverse bar) of each fastener extending in planes parallel to one another. The fasteners are arranged relative to one another so that the respective transverse bars are spaced apart and oriented side-by-side and parallel to one another and so that the respective paddles (or second transverse bars) are spaced apart and oriented side-by-side and parallel to one another. The clip of the foregoing '657 patent also includes a runner bar, said runner bar extending perpendicularly relative to the respective transverse bars and being connected to each of the transverse bars by a severable connector. The clip of said '657 patent further includes a severable member interconnecting each pair of adjacent paddles (or second transverse bars).

Several commercial embodiments of the aforementioned fastener clip have been sold by the present assignee, Avery Dennison Corporation, as DENNISON® SWIFTACH® fastener clips. DENNISON® SWIFTACH® fastener clips comprising fasteners of the type having a cross-bar at one end of a flexible filament and a paddle at the opposite end of the flexible filament are generally made of polypropylene or nylon and are typically used to attach merchandise tags and the like to articles of clothing. The filaments of such fasteners are typically at least about 12.5 mm in length. DENNISON® SWIFTACH® fastener clips comprising fasteners of the type having a first cross-bar at one end of a flexible filament and a second cross-bar at the opposite end of the flexible filament are made of nylon and are used to attach merchandise tags and the like to a wide variety of articles of commerce. In addition, such fasteners are used in shoe-lasting applications and in packaging applications, where the high tensile strength afforded by the use of nylon in the fastener is desirable. The filaments of such fasteners are typically at least about 6.35 mm in length.

As far as the present inventors are aware, the above-described fastener clip, exemplified by the family of DEN- NISON® SWIFTACH® fastener clips, has not been used to maintain an article of clothing, such as a dress shirt, in a folded condition.

A second type of fastener clip (or "fastener stock") is disclosed in U.S. Pat. No. 4,039,078, inventor Bone, issued Aug. 2, 1977, which patent is incorporated herein by reference. In said patent, the fastener stock comprises two undivided elongated and continuous plastic side members having a plurality of plastic cross links coupled to and between each of said side members, each of the links being preferably spaced equidistantly apart from each other The fastener stock is designed to be separated or divided, e.g., by cutting, severing, rupturing or shearing the side members, to provide a plurality of fasteners, each of said fasteners preferably having a substantially H shape.

A commercial embodiment of the aforementioned fastener stock has been sold by the present assignee, Avery Dennison Corporation, as DENNISON® PLASTIC STAPLE™ fasteners. PLASTIC STAPLE™ fasteners are typically made of polyurethane and are often used to attach tags, at two distinct points, to pants and similar clothing articles. It is the understanding of the present inventors that, for a limited time in the past, a third party used PLASTIC STAPLE™ fasteners to "pin" shirts, albeit not dress shirts or other shirts of a fine material, so as to maintain the shirts in a folded condition. It is the understanding of the present inventors that the aforementioned securing was achieved using a dual needle fastener dispensing tool of the type disclosed in U.S. Pat. No. 4,533,076 and was performed by folding the shirt, inserting both needles of the tool entirely through the folded-over article and then dispensing both cross-bars through the needles and the folded article so that both cross-bars were positioned on one side of the article, with the filament connecting the two cross-bars extending over to the opposite side of the article. It is further believed by the present inventors that the aforementioned use of such fasteners to "pin" shirts was discontinued because PLASTIC STAPLE™ fasteners did not have sufficient tensile strength to maintain the shirt in its folded condition (PLASTIC STAPLE™ fasteners typically having a tensile strength of about 1.2–1.4 pounds).

Tools (often referred to as "tagging guns") for dispensing individual fasteners from multi-fastener clips of the two different types described above are known, examples of such tools including the Dennison® Mark II™ SWIFTACH® tool, as well as those tools disclosed in U.S. Pat. Nos. 5,772,073, 5,683,025, 5,024,365, 4,533,076, 4,456,161, 4,121,487, and 4,456,123, all of which are incorporated herein by reference.

Other patents that may be of interest include U.S. Patent No. 3,103,666, inventor Bone, issued Sep. 17, 1963; U.S. Pat. No. 5,593,033, inventor Kunreuther, issued Jan. 14, 1995; U.S. Pat. No. 5,463,799, inventor Graham, issued Nov. 7, 1995; U.S. Pat. No. 5,321,872, inventor Merser, issued Jun. 21, 1994; U.S. Pat. No. 3,733,657, inventor Lankton, issued May 22, 1973, U.S. Pat. No. 4,660,718, inventor Kato et al., issued Apr. 28, 1987; and U.S. Reissue Patent No. 32,332, inventor Kato, re-issued Jan. 20, 1987, all of which are incorporated herein by reference.

SUMMARY OF THE INVENTION

It is an object of the present invention to provide a novel plastic fastener.

Therefore, according to one aspect of the invention, a plastic fastener is provided, said plastic fastener comprising (a) a flexible filament, said flexible filament having a first end and a second end, said flexible filament having a tensile strength of about 2–4 lbs; (b) an inserting element disposed at said first end, said inserting element being dimensioned to permit its insertion through a garment and, once inserted therethrough, to be retained by said garment; and (c) a retaining element disposed at said second end, said retaining element being dimensioned to prevent said flexible filament from being pulled completely through said garment.

According to another aspect of the invention, a plastic fastener is provided, said plastic fastener comprising (a) a flexible filament, said flexible filament having a first end and a second end, said flexible filament having a tensile strength of about 2 lbs., a length of approximately 4.3 mm, and a diameter of approximately 0.2 mm; (b) a first transverse bar disposed at said first end; and (c) a second transverse bar disposed at said second end; (d) wherein each of said first and second transverse bars has a length of approximately 1.8 mm, a width of approximately 0.5 mm and a height of approximately 0.5 mm.

According to still another aspect of the invention, a plastic fastener is provided, said plastic fastener comprising (a) a flexible filament, said flexible filament having a first end and a second end, said flexible filament having a length of approximately 3–5 mm; (b) an inserting element disposed at said first end, said inserting element being dimensioned to permit its insertion through a garment and, once inserted therethrough, to be retained by said garment; and (c) a retaining element disposed at said second end, said retaining element being dimensioned to prevent said flexible filament from being pulled completely through said garment.

It is another object of the present invention to provide a novel fastener clip.

Therefore, according to one aspect of the invention, a fastener clip is provided, said fastener clip comprising (a) a first fastener, said first fastener comprising a flexible filament having a first enlarged end and a second enlarged end, said flexible filament having a length of approximately 3–5 mm; (b) a second fastener, said second fastener comprising a flexible filament having a first enlarged end and a second enlarged end, (c) said first fastener and said second fastener being arranged in a parallel, side-by-side, spaced relationship; (d) a first connector post connecting said first enlarged end of said first fastener to said first enlarged end of said second fastener, and (e) a second connector post connecting said second enlarged end of said second fastener to said second enlarged end of said second fastener.

According to another aspect of the invention, a fastener clip is provided, said fastener clip comprising (a) a first fastener, said first fastener comprising a flexible filament having a first enlarged end and a second enlarged end, said flexible filament having a tensile strength of approximately 2–4 lbs.; (b) a second fastener, said second fastener comprising a flexible filament having a first enlarged end and a second enlarged end; (c) said first fastener and said second fastener being arranged in a parallel, side-by-side, spaced relationship; (d) a first connector post connecting said first enlarged end of said first fastener to said first enlarged end of said second fastener; and (e) a second connector post connecting said second enlarged end of said second fastener to said second enlarged end of said second fastener.

According to still another aspect of the invention, a fastener clip is provided, said fastener clip comprising (a) a first fastener, said first fastener comprising a flexible filament having a first enlarged end and a second enlarged end, said flexible filament having a tensile strength of approximately 2 lbs. and a length of approximately 4.3 mm; (b) a second fastener, said second fastener comprising a flexible filament having a first enlarged end and a second enlarged end; (c) said first fastener and said second fastener being identical to one another and being arranged in a parallel, side-by-side, spaced relationship; (d) a first connector post connecting said first enlarged end of said first fastener to said first enlarged end of said second fastener; and (e) a second connector post connecting said second enlarged end of said second fastener to said second enlarged end of said second fastener.

According to still yet another aspect of the invention, a fastener clip is provided, said fastener clip comprising (a) a first fastener, said first fastener comprising (i) a flexible filament having a first end and a second end, (ii) a first enlargement disposed at said first end, and (iii) a second enlargement disposed at said second end; (b) a third enlargement: said third enlargement being severably connected to said first enlargement; (c) a fourth enlargement, said fourth enlargement not being directly interconnected to said third enlargement, said fourth enlargement being severably connected to said second enlargement.

It is still yet another object of the present invention to provide a novel method of fastening objects.

Therefore, according to one aspect of the invention, there is provided a method of fixing an article of clothing to itself, said method comprising the steps of (a) providing a plastic fastener, said plastic fastener comprising (i) a flexible filament, said flexible filament having a first end, a second end, and a length, said length being suitable to fixedly retain the article of clothing against itself, (ii) an inserting element disposed at said first end, said inserting element being dimensioned to enable its insertion through the article of clothing and, once inserted therethrough, to be retained by the article of clothing, and (iii) a retaining element disposed at said second end, said retaining element being dimensioned to prevent said flexible filament from being pulled completely through the article of clothing, and (b) inserting said inserting element of said plastic fastener into and completely through the article of clothing at at least a pair of locations therein, with said retaining element not being inserted into the article of clothing.

According to another aspect of the invention, a method of fixing an article of commerce to a support is provided, said method comprising the steps of (a) providing a plastic fastener, said plastic fastener comprising (i) a flexible filament, said flexible filament having a first end, a second end and a length, said length being suitable to fixedly retain the article against the support, (ii) an inserting element disposed at said first end, said inserting element being dimensioned to enable its insertion through the article of commerce and the support and, once inserted therethrough, to be retained thereby, and (iii) a retaining element disposed at said second end, said retaining element being dimensioned to prevent said flexible filament from being pulled completely through the article of commerce and the support, and (b) inserting said inserting element of said plastic fastener into and completely through the article of commerce and the support, with said retaining element not being inserted into either the article or the support, in such a way as to fix the article of commerce to the support.

According to still another aspect of the invention, a method of coupling an article of commerce to a support is provided, said method comprising the steps of (a) providing a plastic fastener, said plastic fastener comprising (i) a flexible filament, said flexible filament having a first end, a second end, a tensile strength of approximately 2–4 lbs. and a length of approximately 3–5 mm; (ii) an inserting element disposed at said first end, said inserting element being dimensioned to enable its insertion through the article of commerce and the support and, once inserted therethrough, to be retained thereby, and (iii) a retaining element disposed at said second end, said retaining element being dimensioned to prevent said flexible filament from being pulled completely through the article of commerce and the support in the direction of said inserting element; and (b) inserting said inserting element of said plastic fastener into and completely through the article of commerce and the support.

According to still yet another aspect of the invention, a method of fixing together two elements is provided, said method comprising the steps of (a) providing a plastic fastener, said plastic fastener comprising (i) a flexible filament, said flexible filament having a first end, a second end, a length and a tensile strength, said length being suitable to fix the two elements together, said tensile strength being sufficiently strong to keep the two elements fixed together during normal handling and yet sufficiently weak to enable the two elements to be separated from one another without being damaged by said plastic fastener merely by having the two elements pulled away from each other until said flexible filament breaks, (ii) an inserting element disposed at said first end, said inserting element being dimensioned to enable its insertion through the two elements and, once inserted therethrough, to be retained by the two elements, and (iii) a retaining element disposed at said second end, said retaining element being dimensioned to prevent said flexible filament from being pulled completely through the two elements, and (b) inserting said inserting element of said plastic fastener into and completely through the two elements, with said retaining element not being inserted into the two elements.

According to a further aspect of the invention, a method of coupling together two or more sheets of paper is provided, said method comprising the steps of (a) providing a plastic fastener, said plastic fastener comprising (i) a flexible filament, said flexible filament having a first end, a second end, a length and a tensile strength, said tensile strength being sufficiently strong to keep the sheets of paper coupled together during normal handling and yet sufficiently weak to enable the sheets of paper to be separated from one another without being damaged by said plastic fastener merely by pulling the sheets of paper away from each other until said flexible filament breaks, (ii) an inserting element disposed at said first end, said inserting element being dimensioned to enable its insertion through the sheets of paper and, once inserted therethrough, to be retained by the sheets of paper, and (iii) a retaining element disposed at said second end, said retaining element being dimensioned to prevent said flexible filament from being pulled completely through the sheets of paper; and (b) inserting said inserting element of said plastic fastener into and completely through the sheets of paper, with said retaining element not being inserted into the sheets of paper.

It is still yet another object of the present invention to provide a novel fastener dispensing tool.

Therefore, according to one aspect of the invention, there is provided a handheld fastener dispensing tool for dispensing a fastener of the type comprising a flexible filament having an enlargement at one end thereof, said fastener dispensing tool comprising (a) a casing, said casing being provided with a needle opening; (b) a hollow, slotted needle, said hollow, slotted needle being slidably movable back and forth between a retracted position disposed entirely within said casing and an extended position extending through said needle opening, said hollow, slotted needle being adapted to receive the enlargement of said fastener; (c) an ejector rod, said ejector rod being slidably movable back and forth through said hollow, slotted needle to eject the enlargement disposed therein; and (d) an anvil coupled to said casing and extending in front of said needle opening, said anvil being positioned so that said hollow, slotted needle, when in said extended position, does not extend therebeyond.

According to another aspect of the invention, there is provided a fastener dispensing tool, said fastener dispensing tool comprising (a) a gun-shaped casing, said gun-shaped casing comprising a handle portion and a barrel portion, said barrel portion being provided with an opening; (b) a needle carrier, said needle carrier being slidably mounted in said barrel portion; (c) a hollow, slotted needle, said hollow, slotted needle being coupled to said needle carrier and being insertable back and forth through said opening in said casing; (d) an ejector rod carrier, said ejector rod carrier being slidably mounted in said barrel portion; (e) an ejector rod, said ejector rod being coupled to said ejector rod carrier and being insertable back and forth through said hollow, slotted needle; (f) a linking member coupled to said needle carrier and selectively engageable with said ejector rod carrier for coupling and decoupling said needle carrier to and from said ejector rod carrier so that said needle carrier is caused to slide back and forth in said barrel portion only during a portion of the movement of said ejector rod carrier; and (g) a triggering mechanism, said triggering mechanism comprising a trigger, said trigger being pivotally mounted in said casing and extending partially through said handle portion thereof for manual actuation, said triggering mechanism further comprising a lever disposed within said casing, said lever being pivotally mounted at a first end on a first pin, said first pin being fixed to said trigger, said lever being pivotally mounted at a second end on a second pin, said second pin being fixed to said ejector rod carrier.

According to yet another aspect of the invention, there is provided a fastener dispensing tool for dispensing individual fasteners from a fastener clip, said fastener dispensing tool comprising (a) a casing, said casing being provided with an opening: (b) a hollow, slotted needle, said hollow, slotted needle being slidably movable back and forth through said opening in said casing; (c) an ejector rod, said ejector rod being slidably movable back and forth through said hollow, slotted needle; and (d) a feed guide, said feed guide being stationarily mounted in said casing behind said hollow, slotted needle, said feed guide defining a front portion of a feed track and comprising a stage at the end of said feed track off of which an individual fastener from a fastener clip is loaded into said hollow, slotted needle by said ejector rod.

According to still yet another aspect of the invention, there is provided a fastener dispensing tool for dispensing individual fasteners from a fastener clip, said fastener dispensing tool comprising (a) a casing, said casing being provided with an opening; (b) a hollow, slotted needle, said hollow, slotted needle being slidably movable back and forth between a retracted position and an extended position extending through said opening in said casing; (c) an ejector rod, said ejector rod being slidably movable back and forth between a withdrawn position disposed behind said hollow, slotted needle and an advanced position extending through said hollow, slotted needle; (d) a trigger mechanically coupled to said casing; (e) first coupling means, coupling said trigger to said hollow, slotted needle, for moving said hollow, slotted needle from said retracted position to said extended position and then back to said retracted position during a trigger stoke; and (f) second coupling means, coupling said trigger to said ejector rod, for moving said ejector rod from said withdrawn position to said advanced position and then back to said withdrawn position during a trigger stoke; (g) wherein said first coupling means and said second coupling means are designed so that said ejector rod withdraws from said advanced position together with said hollow, slotted needle as said hollow, slotted needle moves from said extended position to said retracted position.

According to a further aspect of the invention, there is provided a fastener dispensing tool, said fastener dispensing tool comprising (a) a casing, said casing being shaped to receive, entirely within said casing, a clip of fasteners, each of said fasteners in said clip comprising a flexible filament having a first enlarged portion at a first end thereof and a second enlarged portion at a second end thereof; (b) exactly one hollow, slotted needle coupled to said casing, said hollow, slotted needle being adapted to receive the first enlarged portion of a fastener: and (c) an ejector rod disposed within said casing and insertable into said hollow, slotted needle for ejecting from said hollow, slotted needle an enlarged portion of a fastener disposed therein.

According to still a further aspect of the invention, there is provided a fastener dispensing tool, said fastener dispensing tool comprising (a) a casing, said casing being shaped to receive, entirely within said casing, a clip of fasteners, each of said fasteners in said clip comprising a flexible filament having a first enlarged portion at a first end thereof and a second enlarged portion at a second end thereof; (b) a hollow, slotted needle coupled to said casing, said hollow, slotted needle being adapted to receive the first enlarged portion of a fastener; (c) wherein said feed track terminates behind said hollow, slotted needle in a direction substantially perpendicular to the longitudinal axis of said hollow, slotted needle; and (d) an ejector rod disposed within said casing and insertable into said hollow, slotted needle for ejecting from said hollow, slotted needle an enlarged portion of a fastener disposed therein.

Additional objects, features, aspects and advantages of the present invention will be set forth, in part, in the description which follows and, in part, will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts:

FIGS. 4(a) through 4(c) are left side, front right top perspective and front views, respectively, of one embodiment of a fastener dispensing tool constructed according to the teachings of the present invention, the fastener dispensing tool being well-suited for use in dispensing individual fasteners from the clip of FIG. 2;

FIGS. 6(a) through 6(d) are front right bottom perspective, front left top perspective, enlarged left side and enlarged front views, respectively, of the right half of the casing of the tool shown in FIGS. 4(a) through 4(c);

FIGS. 7(a) through 7(d) are front left bottom perspective, front right top perspective, enlarged right side and enlarged front views, respectively, of the left half of the casing of the tool shown in FIGS. 4(a) through 4(c);

FIG. 12 is an enlarged perspective view of the locking pin shown in FIG. 5;

FIGS. 14(a) and 14(b) are front bottom left perspective and right side views, respectively, of the ejector rod carrier shown in FIG. 5;

FIG. 15 is a rear top right perspective view of the ejector clip shown in FIG. 5;

FIG. 16 is a rear top right perspective view of the linking member shown in FIG. 5;

DETAILED DESCRIPTION OF PREFERRED EMBODIMENTS

Figure 1A:
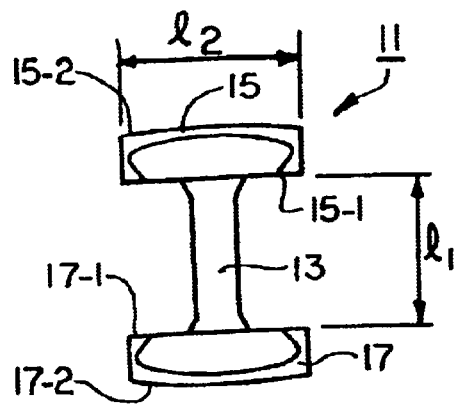
FIGS. 1(a) through 1(c) are side, top and front views, respectively, of one embodiment of a plastic fastener well-suited for maintaining a dress shirt in a folded condition in accordance with the teachings of the present invention.
Figure 1C:
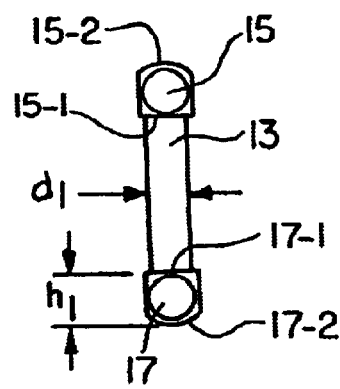
Figure 1B:
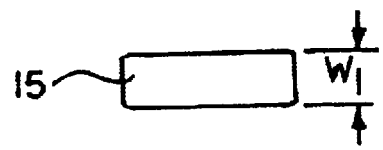

Referring now to FIGS. 1(a) through 1 (c), there are shown side, top and front views, respectively, of one embodiment of a plastic fastener well-suited for maintaining a dress shirt in a folded condition, said plastic fastener being constructed according to the teachings of the present invention and being represented generally by reference numeral 11 (It is to be understood that, although fastener 11 is particularly well-suited for maintaining a dress shirt or the like in a folded condition, it is not limited in its utility thereto and may be used in a variety of different applications including, but not limited to, fixing together pairs of socks, coupling together sheets of paper, fixing dress shirts to cardboard supports, fixing doll clothing to cardboard supports, etc.)

Fastener 11, which is a unitary structure preferably made by molding, comprises a flexible filament 13. When molded, filament 13 has a length $l_r$ of about 1.65 mm and a diameter $d_1$ of about 0.4 mm; filament 13 is thereafter stretched in the conventional manner to a length of approximately 4.3 mm and a diameter of approximately 0.2 mm. It should be noted that, even though, in the present embodiment, filament 13 has a generally cylindrical shape, filament 13 need not be cylindrically shaped and may take a variety of shapes, including those specified in commonly-assigned co-pending U.S. patent application Ser. No. 09/416,784.

Fastener 11 also comprises a first cross-bar 15 and a second cross-bar 17, cross-bar 15 being disposed at a first end of filament 13, cross-bar 17 being disposed at a second end of filament 13, cross-bars 15 and 17 being parallel to one another. Each of cross-bars 15 and 17 has a length $l_2$ of approximately 1.78 mm, a width $w_1$ of approximately 0.55 mm and a height $h_1$ of approximately 0.55 mm. It should be noted that, even though, in the present embodiment, cross-bars 15 and 17 are shaped so as to have flat inner surfaces 15-1 and 17-1, respectively, proximate to filament 13 and convex outer surfaces 15-2 and 17-2, respectively, distal to filament 13, cross-bars 15 and 17 need not be so shaped. In fact, cross-bars 15 and 17 may take a variety of forms, including those of the enlarged ends described in U.S. patent application Ser. No. 09/416,784.

Fastener 11 is preferably made of a polyurethane that gives filament 13 a tensile strength of about 2 pounds. However, it is to be noted that said polyurethane is not the only type of material of which fastener 11 may be made and that other plastic materials (or combinations of materials) capable of providing filament 13 with a tensile strength in the range of about 2–4 pounds (or whatever tensile strength is desirable based upon the particular use to which fastener 11 is put) are also suitable for purposes of the present invention. It is to be noted that, because filament 13 is made of a polyurethane, it has a certain degree of elasticity—a property which may be desirable in certain applications.

Figure 2A:
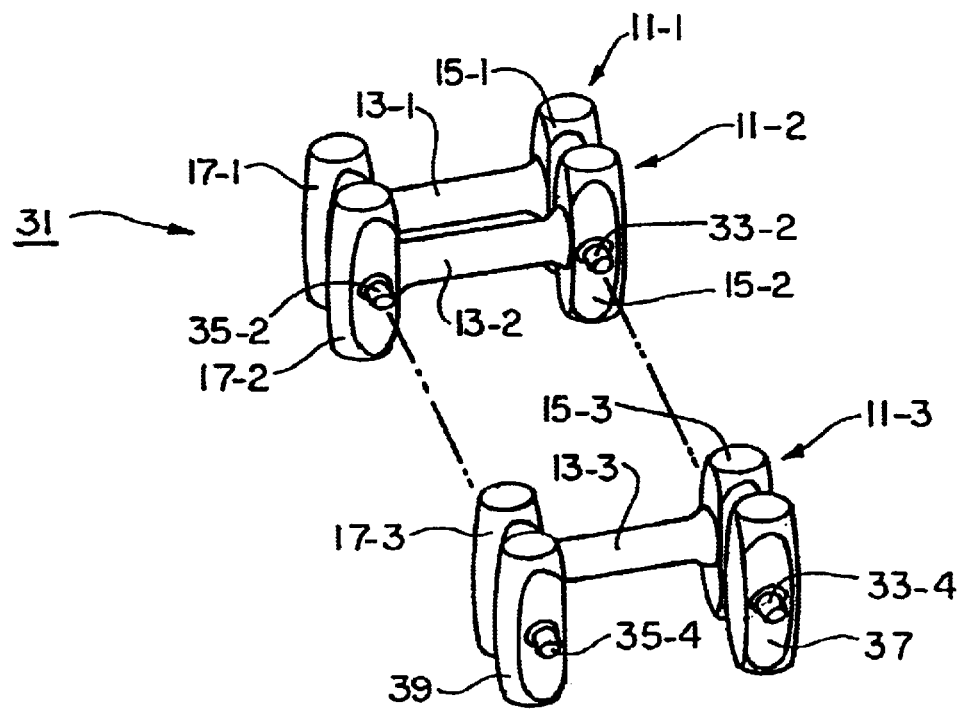
FIGS. 2(a) and 2(b) are partially-exploded perspective and partially-exploded side views, respectively, of one embodiment of a fastener clip constructed in accordance with the teachings of the present invention, the fastener clip including a plurality of the plastic fasteners shown in FIGS. 1(a) through 1(c)
Figure 2B:
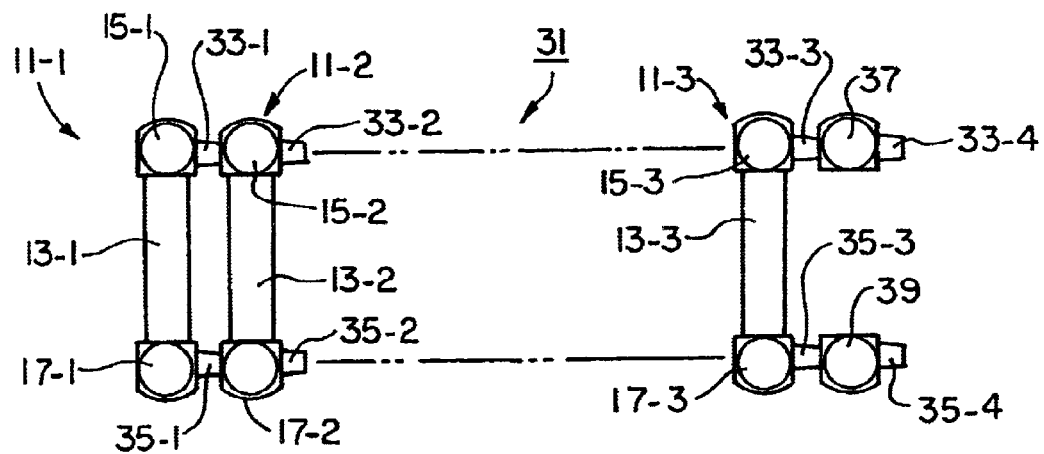

Referring now to FIGS. 2(a) and 2(b), there are shown partially-exploded perspective and partially-exploded side views, respectively, of one embodiment of a fastener clip constructed according to the teachings of the present invention, the fastener clip being represented generally by reference numeral 31.

Clip 31, which is a unitary structure preferably made by molding, comprises a plurality of fasteners 11-1 through 11-3, fasteners 11 being arranged in a parallel, side-by-side, spaced orientation. Although only three fasteners 11 are shown in clip 31, it is to be understood that the number of fasteners 11 in clip 31 is illustrative only and could be increased or decreased without departing from the spirit or scope of the present invention. (In fact, in a preferred embodiment, clip 31 comprises one hundred twenty-five fasteners 11.)

Figure 3A:
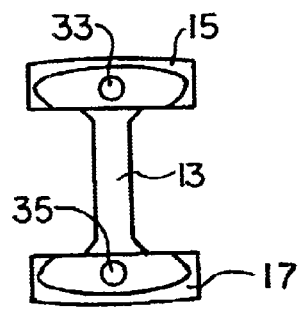
FIGS. 3(a) through 3(c) are side, top and front views, respectively, of an individual fastener of the clip of FIG. 2, together with its associated connectors.
Figure 3B:
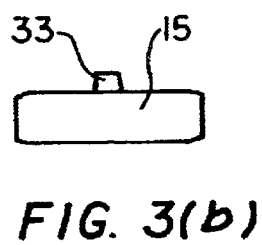
Figure 3C:
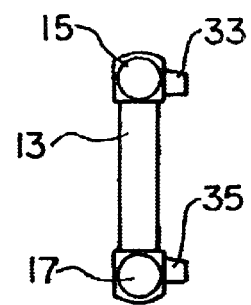

Clip 31 also includes a first plurality of severable connector posts 33-1 and 332 and a second plurality of severable connector posts 35-1 and 35-2, connector posts 33 connecting the mutually-opposing sides of adjacent cross-bars 15 at their approximate midpoints and extending in a substantially perpendicular direction relative to the longitudinal axes of cross-bars 15, connector posts 35 connecting the mutually-opposing sides of adjacent cross-bars 17 at their approximate midpoints and extending in a substantially perpendicular direction relative to the longitudinal axes of cross-bars 17. (Side, top and front views of an individual fastener 11, together with its associated connector posts 33 and 35, are shown in FIGS. 3(a) through 3(c), respectively.) In the present embodiment, connector posts 33 and 35 have a length of approximately 0.25 mm.

Connector posts 33 and 35 are strong enough to maintain the connection between adjacent fasteners 11 in clip 31 prior to the dispensing of individual fasteners 11 from clip 31 and, yet, are weak enough to be severed by the conventional severing action of a fastener dispensing tool. At the same time, connector posts 33 and 35 have a certain degree of flexibility; consequently, because of the arrangement of posts 33 and 35 relative to cross-bars 15 and 17, respectively, adjacent fasteners 11 in clip 31 are permitted to pivot relative to one another, thereby enabling clip 31 to be bent into an arcuate shape.

As seen best in FIG. 2(b), posts 33 and 35 preferably have a conical or tapered transverse cross-section that decreases in diameter from the fastener about to be dispensed (e.g., fastener 11-1) to the next fastener in the clip 31 (e.g., fastener 11-2) so that very little or nothing of the severed posts 33 and 35 that once connected the fastener about to be dispensed to the fastener previously attached to it remain on the about-to-be-dispensed fastener. In this manner, as will be seen below, the fastener about to be dispensed by the tool (e.g., fastener 11-1) is able to sit substantially flush within a tool used to dispense the fastener. It should be understood, however, that the above embodiment is merely a preferred embodiment and that posts 33 and 35 need not be conical or tapered and, instead, may take a variety of shapes.

Clip 31 further includes an extra pair of cross-bars 37 and 39, cross-bars 37 and 39 being identical to cross-bars 15 and 17, respectively, except for the fact that cross-bars 37 and 39 are not disposed at the ends of a flexible filament. Cross-bars 37 and 39 are arranged in a parallel, side-by-side, spaced orientation from cross-bars and 17, respectively, of the last fastener 11 of clip 31 (in the present embodiment, fastener 11-3) and are severably connected thereto by connector posts 33-3 and 353, respectively. Connector post 33-3 is identical to connector posts 33-1 and 33-2, and connector post 35-3 is identical to connector posts 35-1 and 35-2. Cross-bars 37 and 39 serve to keep the last fastener of clip 31 properly oriented while it is being dispensed using the fastener dispensing tool described below.

As can be seen in FIGS. 2(a) and 2(b), clip 31 does not include a runner bar. This may be advantageous since the runner bar of a fastener clip typically has no use once the fasteners originally attached thereto have been dispensed therefrom. As a result, the detached runner bar typically represents economically and environmentally undesirable waste material. In addition, severed connectors previously used to connect fasteners to a runner bar and still remaining on the runner bar after the fasteners have been detached therefrom often have an acute end which may undesirably snag on and damage merchandise when fasteners from the fastener clip are dispensed into such merchandise with a conventional fastener dispensing tool.

Clip 31 may be made by injection molding, preferably using polyurethane or a similar material. According to a preferred embodiment, clip 31 is made by forming a fastener clip analogous to clip 31 but further comprising a runner bar severably connected to each of cross-bars 15 (see, for example, fastener clip 11 of U.S. Ser. No. 09/464,022) and then by severing said runner bar from each of cross-bars 15 and removing the remnants of any connectors connecting said runner bar to cross-bars 15.

It should be noted that, notwithstanding the above-noted generalized shortcomings of runner bar-containing fastener clips, the aforementioned runner bar-containing analog to clip 31 could be substituted for runner bar-less clip 31 and used with an appropriately dimensioned version of a conventional fastener dispensing tool of the type adapted for use with runner bar-containing clips (an example of such a tool being an appropriately dimensioned Dennison® Mark II™ SWIFTACH® tool).

Figure 5:
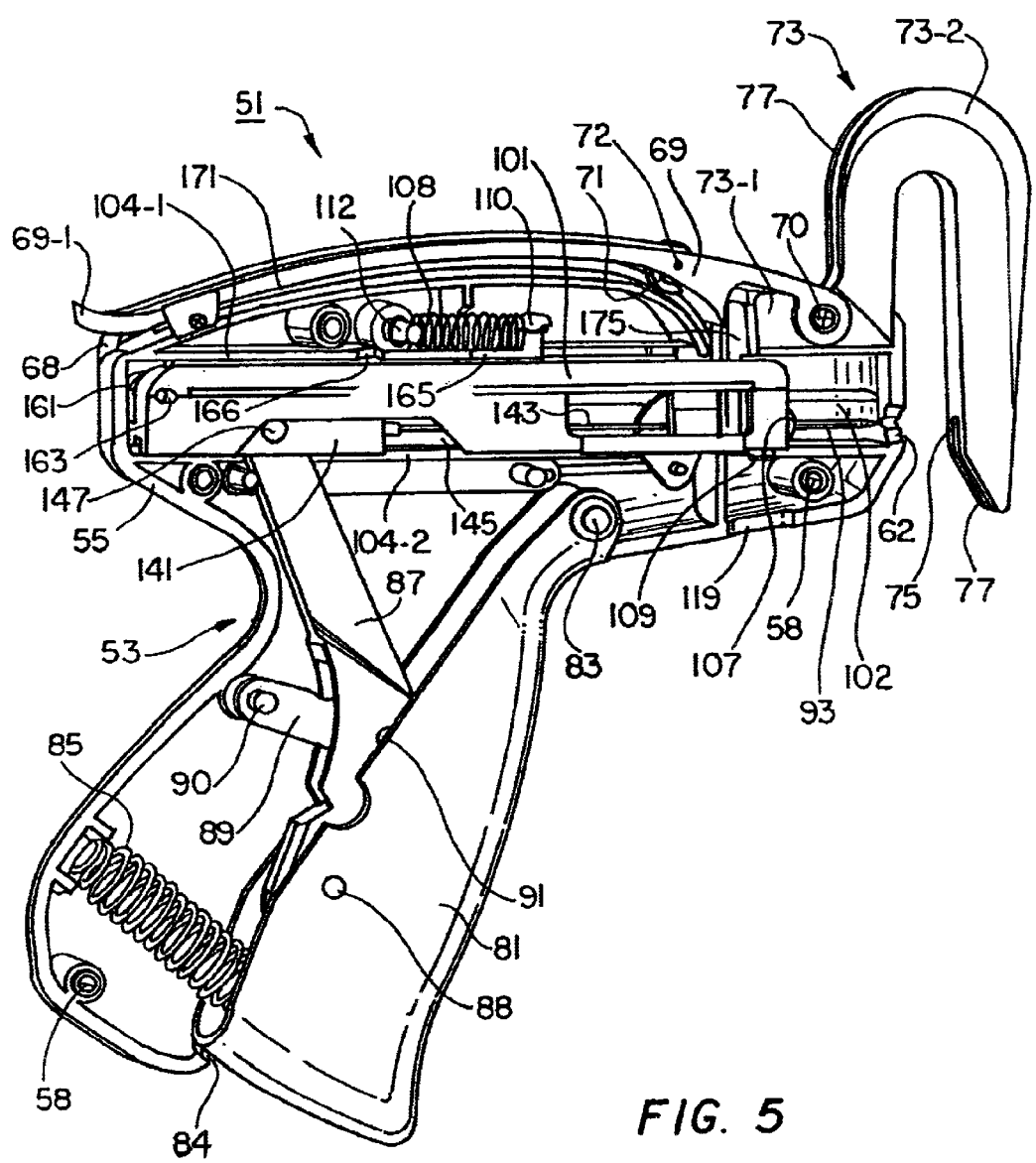
FIG. 5 is a rear, left, top, perspective view of the fastener dispensing tool of FIGS. 4(a) through 4(c), with the left half of the casing not being shown.
Figure 8A:
FIGS. 8(a) through 8(d) are front right top perspective, bottom, section and right views, respectively, of the cover of the tool shown in FIGS. 4(a) through 4(c)
Figure 8B:
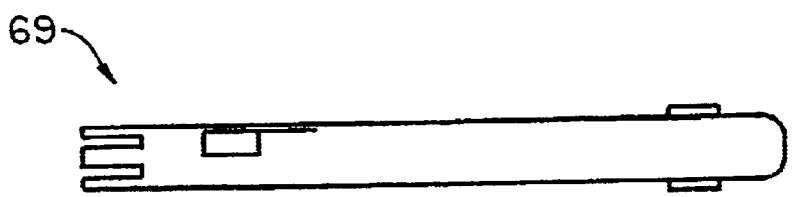
Figure 8C:
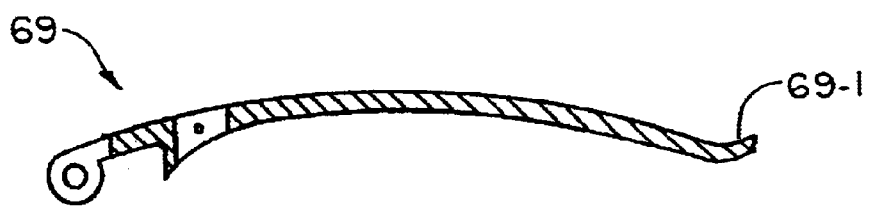
Figure 8D:
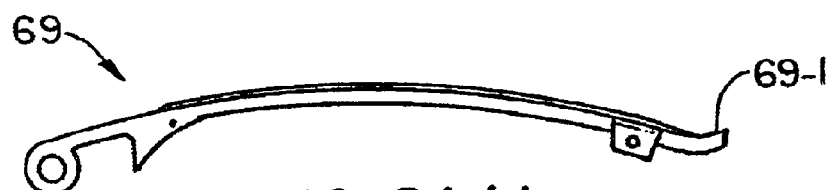
Figure 9A:
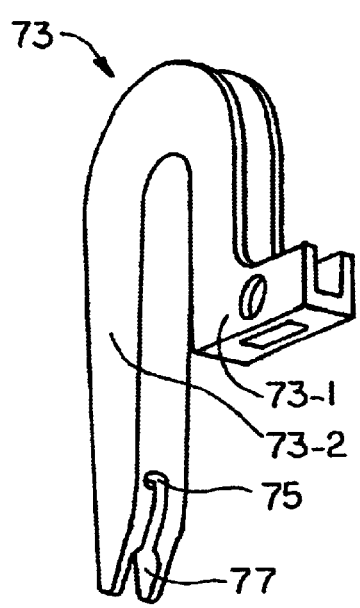
FIGS. 9(a) through 9(d) are rear right top perspective, right side, rear and top perspective views, respectively, of the anvil of the tool shown in FIGS. 4(a) through 4(c)
Figure 9B:
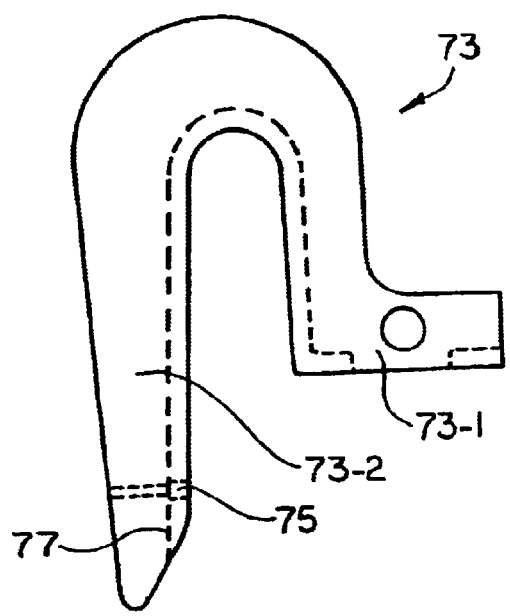
Figure 9C:
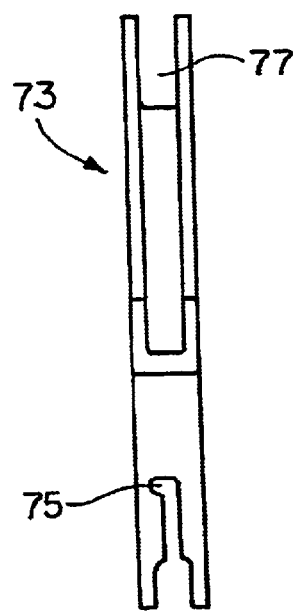
Figure 9D:
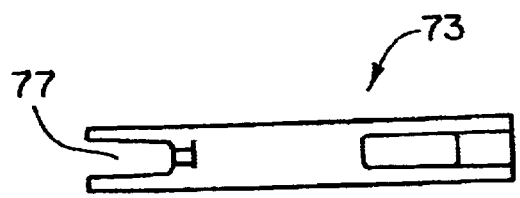

Referring now to FIGS. 4(a) through 4(c) and to FIG. 5, there are shown various views of a fastener dispensing tool that is particularly well-suited for use in dispensing individual fasteners from clip 31, said fastener dispensing tool being constructed according to the teachings of the present invention and being represented generally by reference numeral 51. (Fasteners dispensed by tool 51 may be used to maintain a dress shirt or the like in a folded condition or may be used in other fastening applications.)

Tool 51 includes a hollow, gun-shaped casing 53, casing 53 comprising a right half 55 (which is shown separately in FIGS. 6(a) through 6(d)) and a left half 57 (which is shown separately in FIGS. 7(a) through 7(d)). Halves 55 and 57, which may be fabricated from any convenient durable material, such as molded plastic, are joined together by a plurality of screws 58 and jointly define a handle portion 59 and a barrel portion 61 As seen best in FIG. 4(b), right half 55 and left half 57 also jointly define an opening 62 located at the front end of barrel portion 61, the purpose of opening 62 to be discussed below.

Referring now to FIGS. 6(a) and 7(a), an oval-shaped recess 63-1 is provided on the outer surface of the barrel portion of right half 55, and a corresponding oval-shaped recess 63-2 is provided on the outer surface of the barrel portion of left half 57. Recesses 63-1 and 63-2 are adapted to receive complementary-shaped inserts 64-1 and 64-2, respectively, inserts 64-1 and 64-2 being shown disposed in their respective recesses in FIGS. 4(a) through 4(c). Inserts 64-1 and 64-2 may bear a logo or the like and/or may have a rubberized or gripping outer surface to prevent tool 51 from sliding across a table when placed thereon.

Referring back to FIGS. 6(a) and 7(a), a window 65-1 is provided in the barrel portion of right half 55, and a matching window 65-2 is provided in the barrel portion of left half 57. Windows 65-1 and 65-2 permit a user to monitor the status of a fastener clip 31 disposed inside casing 53. In addition, windows 65-1 and 65-2 provide an opening through which cross-bars 37 and 39 of a clip 31 may exit casing 53 once a clip 31 has been completely spent.

An arrow 67-1 is formed on right half 55 towards the front of its barrel portion, and a matching arrow 67-2 is formed on left half 57 towards the front of its barrel portion. Arrows 67-1 and 67-2 are aligned with opening 62 and are designed to aid a user in aligning tool 51 with an object to be fastened, such as a dress-shirt.

Referring back to FIGS. 4(a) through 4(c) and to FIG. 5, tool 51 further comprises a door 69 (shown separately in FIGS. 8(a) through 8(d)). Door 69, which also may be made from molded plastic or the like, is pivotally mounted at its front end on a screw 70 secured to halves 55 and 57. When door 69 is closed, it substantially covers an opening formed between recesses 55-1 and 57-1 located along the top edges of halves 55 and 57, respectively (recesses 55-1 and 57-1 seen best in FIGS. 6(d) and 7(d), respectively). For reasons to be revealed below, the rear end 69-1 of door 69 is angled upwardly to permit limited access to the interior of casing 53 through an opening 68 even when door 69 is in a closed position. When door 69 is pivoted away from the top of casing 53, the interior of barrel portion 61 (and in particular the feed track to be described below of casing 53) can be accessed.

As seen best in FIG. 5, a ring 71, which is preferably made of rubber or the like, is rotatably mounted on a pin 72 fixed to door 69. Ring 71 is adapted to engage the filament portions of a clip 31 disposed within tool 51 in such a way as to permit manual advancement of a clip 31 through the feed track of tool 51 merely by turning ring 71 from the exterior of casing 53.

Tool 51 further comprises an anvil 73 (shown separately in FIGS. 9(a) through 9(d)). Anvil 73, which is preferably made of molded plastic or the like, includes a rear portion 73-1 and a front portion 73-2. Rear portion 73-1 is disposed within barrel portion 61 of casing 53 and is secured to halves 55 and 57 by screw 70 (anvil 73 sharing screw 70 with door 69). Hooked front portion 73-2 extends upwardly from the top of casing 53 and then loops downwardly in front of tool 51 spaced a short distance from opening 62. Front portion 73-2 is provided with an opening 75, which is aligned with opening 62 and which is appropriately spaced from tool 51 so as to receive the tip of the needle of tool 51. Front portion 73-2 is also provided with an outer slot 77 which is preferably dimensioned depthwise to extend beyond the tip of the needle in its forwardmost position and is preferably dimensioned widthwise to prevent a user from inserting his fingers thereinto. In this manner, anvil 73 not only serves as a support for the fastening operation to be performed by tool 51 but also serves to protect a user from injury caused by accidental needle sticks. As a further safety measure, the spacing between opening 62 of tool and opening 75 of anvil 73 is preferably sufficiently small (e.g., 0.25–0.3 inch) to prevent a user from inserting his fingers therebetween.

As can readily be appreciated, because anvil 73 is secured to casing 53 by screw 70, anvil 73 can easily be replaced if damaged Also, anvil 73 can readily be replaced with an anvil having a different sized loop if one wishes to vary the point of attachment of the fastener dispensed by tool 51 into an object (i.e., generally speaking, the higher the loop, the lower the point of attachment of the fastener into the object).

As seen best in FIG. 5, tool 51 also includes a triggering mechanism whose purpose will become apparent below. In the present embodiment, said triggering mechanism includes a trigger 81 Trigger 81 which may be made of molded plastic or another similarly suitable material, is pivotally attached to casing 53 by a pin 83 and extends partially through an opening 84 formed in handle portion 59 of casing 53 so that it may be digitally manipulated for movement towards and away from, respectively, the rear wall of handle portion 59. A coiled spring 85, which is attached at one end to the inside rear wall of handle portion 59 and which is attached at its opposite end to the inside of trigger 81, biases trigger 81 away from the rear wall of handle portion 59.

The triggering mechanism of tool 51 additionally includes a lever 87 and a float link 89, both of which may be made of molded plastic or another suitable material. Lever 87 is disposed within casing 53 and is pivotally mounted at a first end 87-1 on a pin 88, pin 88 being fixed to trigger 81. Float link 89 is pivotally mounted at one end on a pin 90 mounted inside handle portion 59 and is pivotally mounted at its opposite end on a pin 91 fixed to an intermediate portion of lever 87.

Figure 10C:
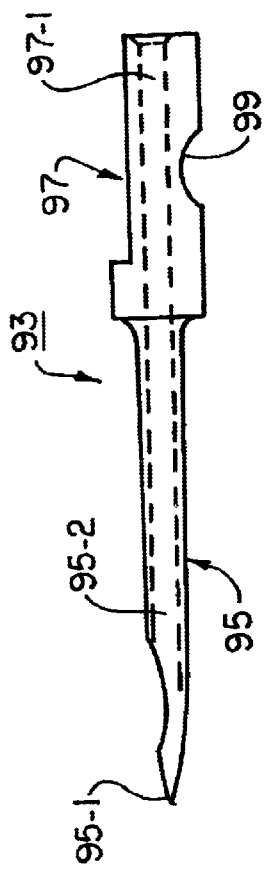
FIGS. 10(a) through 10(c) are rear left top perspective, front right top perspective and right side views, respectively, of the needle shown in FIG. 5, FIGS. 11(a) through 11(f) are front left top perspective, front right top perspective, rear right bottom perspective, top, front and section views, respectively, of the needle carrier shown in FIG. 5.
Figure 10A:
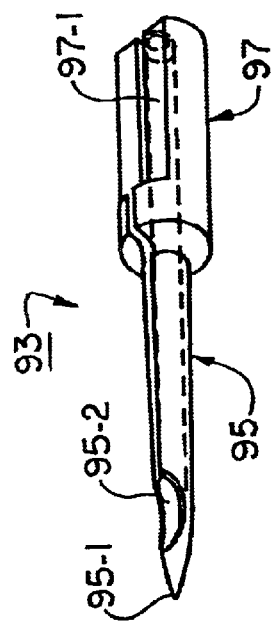
Figure 10B:
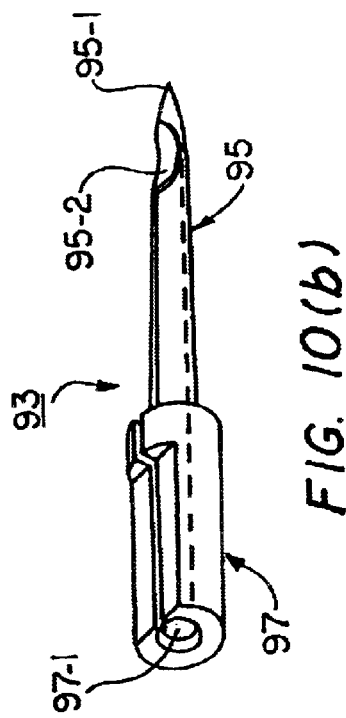

Tool 51 further includes a needle assembly. In the present embodiment, said needle assembly comprises a needle 93. As seen best in FIGS. 10(a) through 10(c), needle 93 comprises a stem portion 95 and a base portion 97. Stem portion 95, which may be made from stamped and rolled metal, is a generally cylindrical member terminating at one end in a sharp tip 95-1 designed for insertion through a garment or like object. Stem portion 95 also has a slotted bore 95-2 extending substantially longitudinally thereacross. Base portion 97 may be made of a plastic that has been insert-molded onto that end of stem portion 95 that is distal to tip 95-1. (Alternatively, stem portion 95 and base portion 97 may be a unitary structure made of metal or another suitable material.) Base portion 97 is provided with a slotted longitudinal bore 97-1 that is aligned with bore 95-2 of stem portion 95 and is also provided with a scallop-shaped recess 99 on its outer surface whose purpose will be described below. The bores of stem portion 95 and base portion 97 are appropriately dimensioned so that cross-bar 15 of a fastener 11 may be inserted thereinto from the rear of base portion 97, traverse the length of needle 93 through bore 95-2 and then exit needle 93 via tip 95-1. The slots of stem portion 95 and base portion 97 are appropriately dimensioned to permit the filament 13 of fastener 11 to extend therethrough while its associated cross-bar 15 is disposed within needle 93, said slots being oriented in tool 51 so as to face towards half 55 of casing 53.

Referring back to FIG. 5, the needle assembly of tool 51 further comprises a needle carrier 101 (shown separately in FIGS. 11(a) through 11(f), needle carrier 101 being slidably mounted in a slot 102 defined at least in part by matching sets of longitudinally extending ribs 104-1/104-2 and 106-1/106-2 integrally formed on right half 55 and left half 57, respectively, of casing 53 (ribs 106-1 and 106-2 being visible in FIGS. 7(b) and 7(c)). One end of a spring 108 is attached to a post 110 formed on needle carrier 101, the opposite end of spring 108 being attached to a post 112 mounted in casing 53. In this manner, needle carrier 101 is normally biased rearwardly in barrel portion 61. Needle carrier 101, which may be made of molded plastic or another suitable material, is provided at its front end with a sleeve 107, sleeve 107 being aligned with opening 62 for reasons to become apparent below. Base portion 97 of needle 93 is disposed within sleeve 107 and is lockably secured therewithin by a locking pin 109.

Referring now to FIG. 12, locking pin 109 can be seen to be a generally cylindrical member having a slotted head 111 (manipulable with a screwdriver or the like) at one end thereof, a longitudinally-extending slot 113 at the opposite end thereof and a scallop-shaped recess 115 on its outer surface at about its midpoint. Recess 115 on pin 109 is appropriately dimensioned to receive base portion 97 of needle 93, and recess 99 of base portion 97 is appropriately dimensioned to receive pin 109.

Figure 11A:
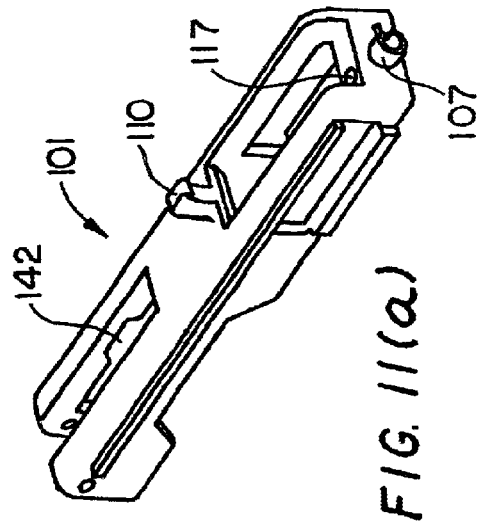

Locking pin 109 is disposed in a bore 117 formed in carrier 101, bore 117 being shown in FIGS. 11(a) through 11(d) and in FIG. 11(f) As seen best in FIG. 11(f), bore 117 and sleeve 107 are oriented relative to one another so that, when pin 109 is rotationally positioned so that recess 115 faces away from needle 93, needle 93 is engaged by pin 109 and, therefore, is locked into sleeve 107 whereas, when pin 109 is rotationally positioned so that recess 115 faces towards needle 93, needle 93 is not engaged by pin 109 and, therefore, is free to be removed from sleeve 107. As can be seen in FIG. 5, slotted head 111 of locking pin 109 is accessible (for use in locking and unlocking needle 93) through an opening 119 formed in the bottom of barrel portion 61.

Figure 13:
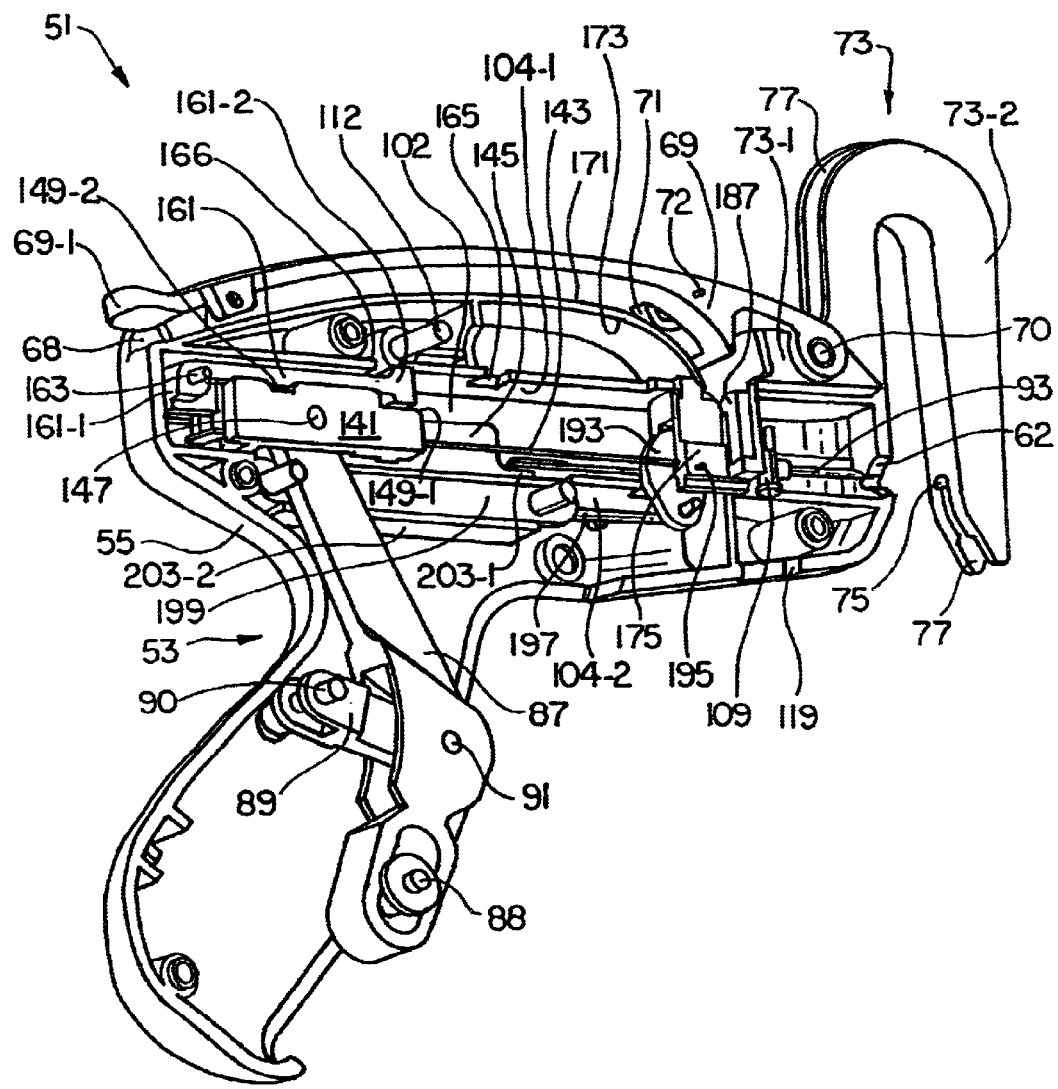
FIG. 13 is a left rear bottom perspective view of the tool shown in FIG. 5, with the left half of the casing, the needle carrier, the trigger and certain additional components not being shown for clarity.

Referring now to FIGS. 5 and 13, tool 51 further includes a mechanism for loading fasteners, one at a time, into needle 93 and for ejecting loaded fasteners from needle 93. In the present embodiment, said loading/ejecting mechanism comprises an ejector rod carrier 141, an ejector rod 143 and an ejector clip 145. Ejector rod carrier 141 (shown separately in FIGS. 14(a) and 14(b)), which may be made of molded plastic or another suitable material, is slidably mounted on the underside of needle carrier 101. Ejector rod carrier 141 is coupled to lever 87 by means of a pin 147 that is fixed to ejector rod carrier 141, lever 87 being pivotally mounted on pin 147. In this manner, when trigger 81 is squeezed, ejector rod carrier 141 is moved forwardly across barrel portion 61; conversely, when trigger 81 is released, ejector rod carrier 141 is moved rearwardly across barrel portion 61. For reasons to be discussed below, the top of carrier 141 is shaped to include a first recessed portion 149-1 at its front end and a second recessed portion 149-2 proximate to its rear end.

Ejector rod 143 is preferably conventional in shape and composition. The rear end of ejector rod 143 is mounted in the front end of carrier 141, the front end of ejector rod 143 extending forwardly away from carrier 141 and being aligned with bore 97-1 of needle 93. In this manner, when trigger 81 is squeezed, ejector rod carrier 141 and ejector rod 143 together move forwardly through barrel portion 61 until the front end of ejector rod 143 is inserted completely through needle 93 Because, as will hereinafter be described, the cross-bar 15 of the lead fastener 11 of a fastener clip 31 loaded in tool 51 is positioned behind bore 97-1 of needle 93, as the front end of ejector rod 143 moves forwardly through barrel portion 61, it pushes said cross-bar into and through needle 93, in the process severing the connector 33 between said cross-bar and its adjacent cross-bar 15.

Ejector clip 145, which is shown separately in FIG. 15, is preferably a unitary structure made of stamped stainless steel or the like. Clip 145, which is positioned between the right side of ejector carrier 141 and the inner right side of needle carrier 101, is shaped to include a front portion 151-1 and a rear portion 151-2. Front portion 151-1 is provided with a tip 152, tip 152 being aligned with cross-bar 17 of the lead fastener 11. Rear portion 151-2 is provided with an elongated slot 153 through which pin 147 extends. As can be seen best in FIG. 15, the rear end 153-1 of slot 153 is angled upwardly. In this manner, as ejector rod carrier 141 begins its forward movement through barrel portion 61 and as the front end of ejector rod 143 pushes cross-bar 15 of the lead fastener into needle 93, pin 147 begins to move forwardly through slot 153 from rear end 153-1, causing clip 145 to be moved forwardly a short distance and causing tip 152 of clip 145 to engage cross-bar 17 of the lead fastener and to push it forwardly until the connector 35 connecting cross-bar 17 to the remainder of the clip 31 breaks. As carrier 141 continues to move forwardly, pin 147 moves through the straight front end 153-2 of slot, causing clip 145 to remain stationary while carrier 141 moves forwardly Later, as carrier 141 makes its rearward movement through barrel portion 61 (as trigger 81 is released), pin 147 moves rearwardly through slot 153, and clip 145 is restored to its original position.

Referring back to FIGS. 5 and 13, tool 51 further comprises a mechanism for coupling and decoupling ejector rod carrier 141 to and from needle carrier 101. In the present embodiment, said mechanism comprises a linking member 161 (shown separately in FIG. 16). Linking member 161, which may be made of molded plastic or a similarly suitable material, is seated in a slot 142 (shown best in FIGS. 11(a) and 11(b)) formed in needle carrier 101 and is pivotally mounted at one end 161-1 to needle carrier 101 by a pin 163.

As seen best in FIG. 13, the front end 161-2 of linking member 161 is enlarged and, prior to actuation of trigger 81, is disposed over the recessed portion 149-1 of carrier 141. When trigger 81 is first squeezed, carrier 141 moves forwardly: however, because of recessed portion 149-1, carrier 141 does not initially engage the enlarged front end 161-2 of linking member 161 As a result, linking member 161 and, in turn, needle carrier 101 are not initially coupled to carrier 141 and do not initially move forwardly with carrier 141. During the aforementioned part of the trigger stroke, ejector rod 143 severs the lead cross-bar 15 from its adjacent cross-bar 15 and feeds the lead cross-bar 15 into needle 93.

Continued squeezing of trigger 81 causes that portion of carrier 141 located immediately behind recessed portion 149-1 to pivot front end 161-2 of linking member 161 up against rib 104-1, thereby causing linking member 161 and, in turn, needle carrier 101 to be coupled to carrier 141. Thus, once coupled together, carrier 101, linking member 161 and carrier 141 begin to move forwardly together through slot 102. During this part of the trigger stroke, needle 93 and ejector rod 143 move together, with tip 95-1 of needle 93 passing through opening 62 of casing 53 and through opening 75 of anvil 73.

Further continued squeezing of trigger 81 causes linking member 161 and carrier 141 to be decoupled as front end 161-2 of linking member 161 arrives at and is forced through an opening 165 formed in rib 104-1 (a corresponding opening being provided in rib 106-1) while carrier 141 continues to move forwardly through barrel portion 61. During this part of the trigger stroke, ejector rod 143 continues to move forwardly through the now-stationary needle 93.

Still further continued squeezing of trigger 81 causes ejector carrier 141 to slide across the now-stationary enlarged end 161-2 of member 161 until enlarged end 161-2 drops down into recessed portion 149-2 of carrier 141. During this part of the trigger stroke, ejector rod 143 completes its forward progress through needle 93.

When trigger 81 is initially released, carrier 141 and member 161 move rearwardly together (with enlarged end 161-2 disposed in recessed portion 149-2 and pressed up against rib 104-1) until member 161 is fully withdrawn and enlarged end 161-2 is aligned with an opening 166 in rib 104-1 (a corresponding opening being provided in rib 106-1). During this part of the trigger stroke, ejector rod 143 and needle 93 move rearwardly together, with needle 93 being completely withdrawn into casing 53 through opening 62. The primary reason for having needle 93 and ejector rod 143 simultaneously withdraw at the beginning of the trigger release, instead of simply reversing the sequence of events that took place during the squeezing of trigger 81 (which would involve having ejector rod 143 first retract partially while needle 93 is kept stationary), is to prevent the cross-bar 15 that is being dispensed through needle 93 from toggling back into the needle 93 after retraction of ejector rod 143. This undesired outcome is prevented in the present arrangement by having needle 93 and ejector rod 143 retract together until needle 93 has fully retracted.

Continued release of trigger 81 causes carrier 141 to slide rearwardly across the now-stationary enlarged end 161-2 until carrier 141 is fully withdrawn and enlarged end 161-2 is returned to its starting position over recessed portion 149-1. During this part of the trigger stroke, ejector rod 143 fully retracts.

Tool 51 further comprises a feed track 171 along which a fastener clip 31 may be advanced through tool 51 to a position where individual fasteners can be loaded into and dispensed from needle 93. Feed track 171, which extends from the rear of opening 68 to just behind bore 97-1 of needle 93, is defined, in part, by a matching pair of arcuate ribs 173-1 and 173-2 formed interiorly along the barrel portion of halves 55 and 57, respectively, and is defined, in part, by a feed guide 175 (shown separately in FIGS. 17(*a*) through 17(*c*)) stationarily mounted in barrel portion 61 just behind needle 93. Feed track 171 is appropriately dimensioned so that the entirety of a clip analogous to clip 31 but comprising one hundred twenty-five fasteners 11 can be completely contained within tool 51. As can readily be appreciated, even longer fastener clips (e.g., clips having several hundred fasteners 11) can be disposed in feed track 171, with the rear end of such clips extending out through opening 68 of tool 51.

Figure 17B:
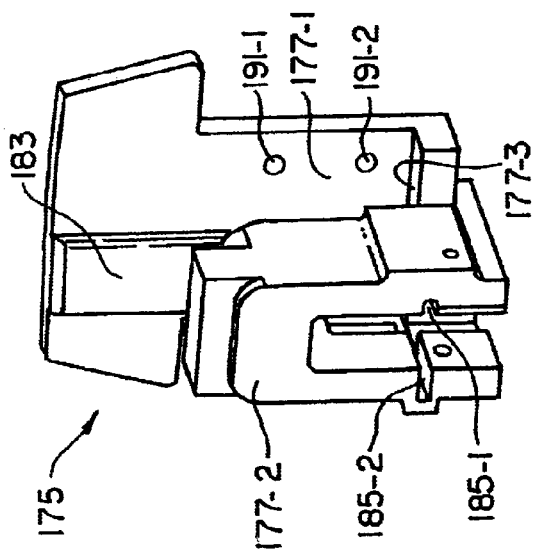
FIGS. 17(a) through 17(c) are front bottom right perspective, rear top left perspective and right side views, respectively, of the feed guide shown in FIG. 5.
Figure 17C:
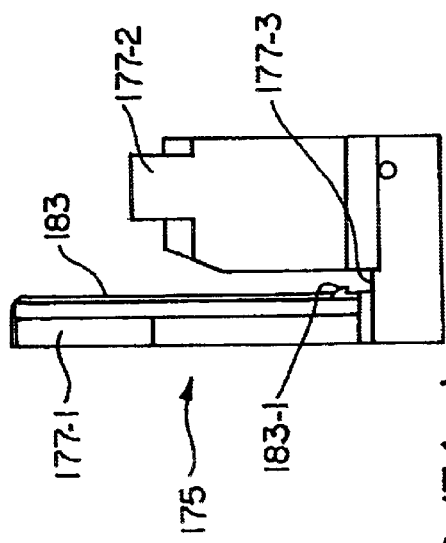
Figure 17A:
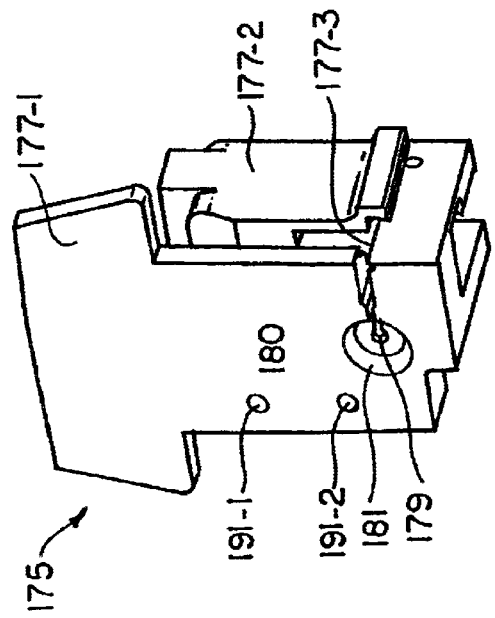

Referring now to FIGS. 17(*a*) through 17(*c*), feed guide 175, which is preferably a unitary structure made of molded plastic or the like, is shaped to include a front portion 177-1, a rear portion 177-2 and an intermediate portion 177-3 Front portion 177-1 is provided with a slotted bore 179, which is aligned with bore 97-1 of needle 93 and which is also aligned with ejector rod 143, and is also provided with a slot 180, which is aligned with tip 152 of clip 145 In addition, the front surface of front portion 177-1 is shaped to include a recessed area 181, which is adapted to receive the rear of base portion 97 of needle 93 as needle 93 is moved back and forth by needle carrier 101. Furthermore, the rear surface of front 177-1 is shaped to include a guide rib 183, guide rib 183 being positioned in feed track 171 and being appropriately dimensioned to keep cross-bars 15 and 17 properly aligned on opposite sides thereof as a clip 31 travels downwardly through feed track 171. A downwardly and outwardly angled bump 183-1 is provided on rib 183, bump 183-1 being positioned on rib 183 and appropriately dimensioned so that the filament 15 of the lead fastener 11 slides thereacross as said fastener moves into position to be dispensed but, once drawn past bump 183-1, cannot easily be pulled back thereover. In this manner, bump 183-1 acts as an anti-back to prevent a clip 31 from moving backwards in feed track 171 during the as yet to be described feeding operation of the clip.

The top surface of intermediate portion 177-3 constitutes the front end of feed track 171 and functions as a stage on which the lead fastener 11 of clip 31 is situated prior to being dispensed by tool 51.

A pair of transverse openings 185-1 and 185-2 are provided in rear portion 177-2 of guide 175, opening 185-1 being positioned so that it is aligned both with ejector rod 143 and with bore 179, opening 185-2 being positioned so that it is aligned with tip 152 of clip 145 and with slot 180.

As cross-bar 15 of the lead fastener 11 is pushed by ejector rod 143 through opening 179, the severable connector 33 connecting said cross-bar 15 to its adjacent cross-bar 15 is severed. Likewise, as cross-bar 17 of the lead fastener 11 is pushed by ejector clip 145 through slot 180, the severable connector 35 connecting said cross-bar 17 to its adjacent cross-bar 17 is severed. As noted above, one advantage to having connectors 33 and 35 taper in the manner described above is that, once connectors 33 and 35 between the lead fastener and its adjacent fastener have been severed and the lead fastener has been dispensed, the cross-bars 15 and 17 of the adjacent fastener are capable of sitting substantially flush on top of the top surface of portion 177-3. As also noted above, cross-bars 37 and 39 ensure that cross-bars 15 and 17 of the last fastener 11 of clip 31 remain properly aligned with bore 179 and slot 180, respectively.

Figure 18B:
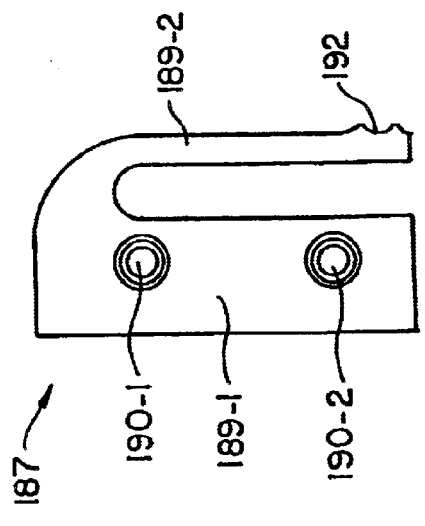
FIGS. 18(a) and 18(b) are front bottom right perspective and front views, respectively, of the feed clip shown in FIG. 13.
Figure 18A:
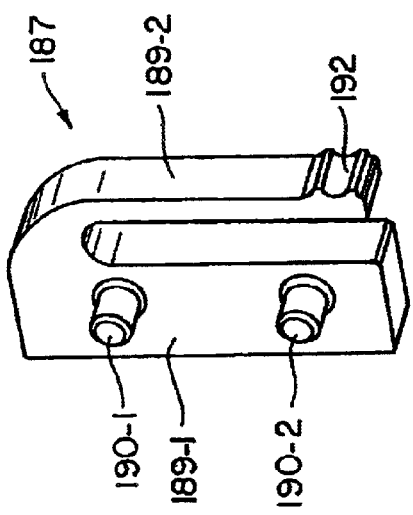

Referring back now to FIG. 13, tool 51 further comprises a feed clip 187, clip 187 being mounted on guide 175 for use in maintaining the alignment of cross-bar 15 of the lead fastener 11 with bore 179 while said cross-bar 15 is seated on top of portion 177-3 of guide 175. As seen best in FIGS. 18(*a*) and 18(*b*), clip 187 is a unitary structure, preferably made of molded plastic, comprising a main portion 189-1 and an arm 189-2. Main portion 189-1 is provided with a pair of mounting posts 190-1 and 190-2 insertable into a pair of corresponding openings 191-1 and 191-2 formed in guide 175. Arm 189-2, which is biased away from main portion 189-1, is shaped to include a finger 192 adapted to engage cross-bar 15 of the lead fastener 11.

Figure 20:
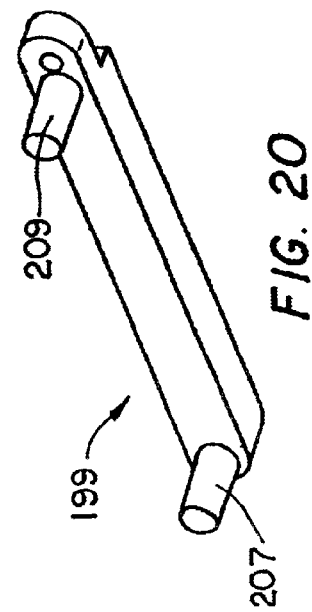
FIG. 20 is a front bottom left perspective view of the feed sliding member shown in FIG. 13.
Figure 19:
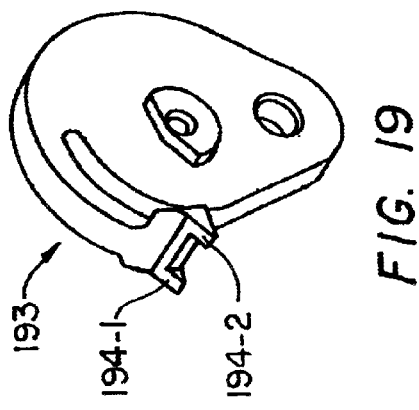
FIG. 19 is a front top right perspective view of the pawl shown in FIG. 13.

Referring back now to FIG. 13, tool 51 further comprises a mechanism for feeding or advancing a clip 31 through feed track 171 at a rate of one fastener per trigger stroke. In the present embodiment, said feeding or advancing mechanism comprises a pawl 193 made of molded plastic or a similarly suitable material. Pawl 193, which is shaped to include a pair of fingers 194-1 and 194-2 (see FIG. 19) engageable with the filament portion 15 of a clip 31 seated in guide 175, is rotatably mounted on guide 175 by a pin 195. In addition, pawl 193 is mechanically coupled by a wire hook 197 to a feed sliding member 199 (shown separately in FIG. 20) slidably mounted in a slot defined by ribs 203-1/203-2 and 205-1/205-2 on halves 55 and 57, respectively, of casing 53 (ribs 205-1 and 205-2 being shown in FIGS. 7(*b*) and 7(*c*)). A rear post 207 is formed at the rear end of member 199, and a front post 209 is formed proximate to the front end of member 199. Posts 207 and 209 are appropriately positioned on member 199 so that, when trigger 81 is nearly completely squeezed, lever 87 contacts post 209 and moves member 199 forwardly a short distance. This causes pawl 193 to rotate away from the fasteners positioned in guide 175. Then, when trigger 81 is released, lever 87 contacts post 207 and moves member 199 rearwardly a short distance This causes pawl 193 to rotate towards the fasteners positioned in guide 175, whereby fingers 194-1 and 194-2 engage the filament portion of the clip and pull the clip down to advance it by one fastener.

To prepare tool 51 for use, clip 31 (or more preferably a fastener clip analogous to clip 31 but comprising on the order of one hundred twenty-five fasteners 11) is loaded into tool 51. This is typically done by opening door 69, inserting the clip into feed track 171 (i.e., by orienting the clip relative to ribs 173-1 and 173-2 so that the respective filaments 15 are disposed on top of and across ribs 173-1 and 173-2 and so that the respective cross-bars 15 and 17 are positioned off to the sides of and perpendicular to ribs 173-1 and 173-2), closing door 69, and advancing the clip through feed track 171 using wheel 71 With tool 51 thus loaded, a fastener 11 may be inserted into a desired article first by placing the article between opening 62 in casing 53 and opening 75 in anvil 73 (arrows 67-1 and 67-2 optionally being used to locate openings 62 and 75) and then by squeezing and releasing trigger 81 in the manner described above.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of fixing an article of clothing to itself, said method comprising the steps of:
    (a) providing a plastic fastener, said plastic fastener comprising
        (i) a flexible filament, said flexible filament having a first end, a second end, and a length, said length being suitable to fixedly retain the article of clothing against itself,
        (ii) an inserting element disposed at said first end, said inserting element being dimensioned to enable its insertion through the article of clothing and, once inserted therethrough, to be retained by the article of clothing, and
        (iii) a retaining element disposed at said second end, said retaining element being dimensioned to prevent said flexible filament from being pulled completely through the article of clothing; and
    (b) inserting said inserting element of said plastic fastener into and completely through the article of clothing at at least a pair of locations therein, with said retaining element not being inserted into the article of clothing.

2. The method as claimed in claim 1 wherein said flexible filament has a tensile strength of 2–4 lbs.

3. The method as claimed in claim 2 wherein said flexible filament has a tensile strength of 2 lbs.

4. The method as claimed in claim 1 wherein said flexible filament has a length of approximately 3–5 mm.

5. The method as claimed in claim 4 wherein said flexible filament has a length of approximately 4.3 mm.

6. The method as claimed in claim 1 wherein the article of clothing is a dress shirt and wherein said flexible filament has a tensile strength of 2–4 lbs. and a length of approximately 3–5 mm.

7. The method as claimed in claim 6 wherein said flexible filament has a tensile strength of 2 lbs. and a length of approximately 4.3 mm.

8. A method of fixing an article of commerce to a support, wherein the article of commerce is a dress shirt and wherein the support is a cardboard backing, said method comprising the steps of:
    (a) providing a plastic fastener, said plastic fastener comprising
        (i) a flexible filament, said flexible filament having a first end, a second end and a length, said length being suitable to fixedly retain the article of commerce against the support
        (ii) an inserting element disposed at said first end, said inserting element being dimensioned to enable its insertion through the article of commerce and the support and, once inserted therethrough, to be retained thereby, and
        (iii) a retaining element disposed at said second end, said retaining element being dimensioned to prevent said flexible filament from being pulled completely through the article of commerce and the support; and
    (b) inserting said inserting element of said plastic fastener into and completely through the article of commerce and the support, with said retaining element not being inserted into either the article or the support, in such a way as to fix the article of commerce to the support.

9. The method as claimed in claim 8 wherein said flexible filament has a tensile strength of 2–4 lbs.

10. The method as claimed in claim 9 wherein said flexible filament has a tensile strength of 2 lbs.

11. The method as claimed in claim 10 wherein said flexible filament has a length of approximately 3–5 mm.

12. The method as claimed in claim 11 wherein said flexible filament has a length of approximately 4.3 mm.

13. The method as claimed in claim 8 wherein said flexible filament has a tensile strength of 2–4 lbs. and a length of approximately 3–5 mm.

14. A method of coupling an article of commerce to a support, said method comprising the steps of:
    (a) providing a plastic fastener, said plastic fastener comprising
        (i) a flexible filament, said flexible filament having a first end, a second end, a tensile strength of approximately 2–4 lbs. and a length of approximately 3–5 mm;
        (ii) an inserting element disposed at said first end, said inserting element being dimensioned to enable its insertion through the article of commerce and the support and, once inserted therethrough, to be retained thereby, and
        (iii) a retaining element disposed at said second end, said retaining element being dimensioned to prevent said flexible filament from being pulled completely through the article of commerce and the support in the direction of said inserting element; and
    (b) inserting said inserting element of said plastic fastener into and completely through the article of commerce and the support.

15. A method of fixing together two elements, said method comprising the steps of:
    (a) providing a plastic fastener, said plastic fastener comprising
        (i) a flexible filament, said flexible filament having a first end, a second end, a length and a tensile strength, said length being suitable to fix the two elements together, said tensile strength being sufficiently strong to keep the two elements fixed together during normal handling and yet sufficiently weak to enable the two elements to be separated from one another without being damaged by said plastic fastener merely by having the two elements pulled away from each other until said flexible filament breaks,
        (ii) an inserting element disposed at said first end, said inserting element being dimensioned to enable its insertion through the two elements and, once inserted therethrough, to be retained by the two elements, and
        (iii) a retaining element disposed at said second end, said retaining element being dimensioned to prevent said flexible filament from being pulled completely through the two elements; and
    (b) inserting said inserting element of said plastic fastener into and completely through the two elements, with said retaining element not being inserted into the two elements.

16. The method as claimed in claim 15 wherein said two elements are different portions of a single article of clothing.

17. The method as claimed in claim 16 wherein said article of clothing is a dress shirt.

18. The method as claimed in claim 17 wherein said length of said flexible filament is approximately 4.3 mm and wherein said tensile strength of said flexible filament is approximately 2 lbs.

19. The method as claimed in claim 15 wherein one of said two elements is an article of clothing and wherein the other of said two elements is a cardboard support.

20. The method as claimed in claim 19 wherein said article of clothing is a dress shirt.

21. The method as claimed in claim 20 wherein said length of said flexible filament is approximately 4.3 mm and wherein said tensile strength of said flexible filament is approximately 2 lbs.

22. The method as claimed in claim 20 wherein said article of clothing is an article of clothing for a doll.

23. The method as claimed in claim 22 wherein said article of clothing is a doll's dress.

24. The method as claimed in claim 20 wherein said length of said flexible filament is approximately 4.3 mm and wherein said tensile strength of said flexible filament is approximately 2 lbs.

25. The method as claimed in claim 15 wherein said two elements are two articles of clothing.

26. The method as claimed in claim 25 wherein said two elements are a pair of socks.

27. The method as claimed in claim 15 wherein said two elements are two sheets of paper.

28. A method of coupling together two or more sheets of paper, said method comprising the steps of:
 (a) providing a plastic fastener, said plastic fastener comprising
  (i) a flexible filament, said flexible filament having a first end, a second end, a length and a tensile strength, said tensile strength being sufficiently strong to keep the sheets of paper coupled together during normal handling and yet sufficiently weak to enable the sheets of paper to be separated from one another without being damaged by said plastic fastener merely by pulling the sheets of paper away from each other until said flexible filament breaks,
  (ii) an inserting element disposed at said first end, said inserting element being dimensioned to enable its insertion through the sheets of paper and, once inserted therethrough, to be retained by the sheets of paper, and
  (iii) a retaining element disposed at said second end, said retaining element being dimensioned to prevent said flexible filament from being pulled completely through the sheets of paper; and
 (b) inserting said inserting element of said plastic fastener into and completely through the sheets of paper, with said retaining element not being inserted into the sheets of paper.

\* \* \* \* \*